US009690522B2

(12) United States Patent
Yasukawa

(10) Patent No.: US 9,690,522 B2
(45) Date of Patent: Jun. 27, 2017

(54) PRINTING APPARATUS, PRINTING SYSTEM, AND CONTROL METHOD OF PRINTING APPARATUS TO DETERMINE WHETHER TO PERMIT OR RESTRICT PRINT JOBS

(71) Applicant: CANON KABUSHIKI KAISHA, Tokyo (JP)

(72) Inventor: Akari Yasukawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/746,604

(22) Filed: Jun. 22, 2015

(65) Prior Publication Data

US 2015/0378648 A1 Dec. 31, 2015

(30) Foreign Application Priority Data

Jun. 27, 2014 (JP) ................................ 2014-132331

(51) Int. Cl.
*G06K 15/00* (2006.01)
*G06F 3/12* (2006.01)

(52) U.S. Cl.
CPC .......... *G06F 3/1219* (2013.01); *G06F 3/1239* (2013.01); *G06F 3/1285* (2013.01)

(58) Field of Classification Search
CPC combination set(s) only.
See application file for complete search history.

(56) References Cited

U.S. PATENT DOCUMENTS

2006/0132823 A1* 6/2006 Sakamoto ............. G06F 3/1222 358/1.14
2007/0229873 A1* 10/2007 Kato ..................... G06F 3/1219 358/1.14
2007/0231038 A1* 10/2007 Uchida ................. G06F 3/1218 400/76
2009/0122347 A1* 5/2009 Utsubo ................. G06F 21/608 358/1.16

FOREIGN PATENT DOCUMENTS

JP 2009-199253 A 9/2009
JP 2011-198166 A 10/2011

* cited by examiner

*Primary Examiner* — Henok A Shiferaw
(74) *Attorney, Agent, or Firm* — Canon U.S.A., Inc. IP Division

(57) ABSTRACT

A system includes storage and control units in a printing apparatus, obtainment and first transmission units in a first computer, and a second transmission unit in a second computer. The storage unit stores print restriction information defining a setting content to permit or restrict printing for each user. The print restriction information of a first computer user is obtained. A first print job including the obtained print restriction information, a first print setting, a second print job including identification information of a second computer user and a second print setting are transmitted. The control unit determines whether to permit or restrict the first print job based on the first print setting and the first print job print restriction information, and determines whether to permit or restrict the second print job based on the second print setting and print restriction information specified by using the second print job user identification information.

12 Claims, 20 Drawing Sheets

| USER NAME (301) | PASSWORD (302) | ROLE (303) |
|---|---|---|
| User1 | Akd5sj4f | Administrator role |
| User2 | saFjf98w | Role1 |
| User3 | vGks9jgla | Role2 |
| User4 | 81uc73a | Role3 |

Rows: 304, 305, 306, 307

| ROLE NAME (311) | PRINTING FUNCTION (312) | COLOR (313) | ONE SIDED (314) | Nup (315) |
|---|---|---|---|---|
| Administrator role | PERMITTED | PERMITTED | PERMITTED | 1-UP OR MORE |
| Role1 | PERMITTED | PERMITTED | PERMITTED | 2-UP OR MORE |
| Role2 | PERMITTED | PERMITTED | PROHIBITED | 2-UP OR MORE |
| Role3 | PROHIBITED | — | — | — |

Rows: 316, 317, 318, 319

| BYTE \ BIT | 7 | 6 | 5 | 4 | 3 | 2 | 1 | 0 | |
|---|---|---|---|---|---|---|---|---|---|
| 0 | OPERATION CODE INDICATING RESTRICTION INFORMATION (= 0x0301) | | | | | | | | |
| 1 | | | | | | | | | |
| 2 | BLOCK NUMBER | | | | | | | | |
| 3 | | | | | | | | | |
| 4 | PARAMETER LENGTH | | | | | | | | |
| 5 | | | | | | | | | |
| 6 | FLAG AREA | | | | | | | | |
| 7 | | | | | | | | | |
| 8 | Reserved | | | | | | | | |
| 9 | | | | | | | | | |
| 10 | | | | | | | | | |
| 11 | | | | | | | | | |
| 12 ~ | RESTRICTION INFORMATION | | | | | | | | 601 |
| | | | | | | | | NULL | 603 |
| | SIGNATURE (128 BYTE) | | | | | | | | 602 |

```
<UserInfo>
    <UserName>User3</UserName>
    <Role>Role2</Role>
</UserInfo>
<Category="PdlPrint">
    <Value Name="PdlPrint">Permit</Value>
    <Value Name="ColorPrint">Permit</Value>
    <Value Name="Simplex">Deny</Value>
    <Value Name="Nup">2</Value>
</Category>
```

<table>
<tr><th>BYTE \ BIT</th><th>7</th><th>6</th><th>5</th><th>4</th><th>3</th><th>2</th><th>1</th><th>0</th><th></th></tr>
<tr><td>0</td><td colspan="8" rowspan="2">OPERATION CODE INDICATING START OF JOB WITH AUTHENTICATION INFORMATION (= 0x0302)</td><td rowspan="2"></td></tr>
<tr><td>1</td></tr>
<tr><td>2</td><td colspan="8" rowspan="2">BLOCK NUMBER</td><td rowspan="2"></td></tr>
<tr><td>3</td></tr>
<tr><td>4</td><td colspan="8" rowspan="2">PARAMETER LENGTH</td><td rowspan="2"></td></tr>
<tr><td>5</td></tr>
<tr><td>6</td><td colspan="8" rowspan="2">FLAG AREA</td><td rowspan="2"></td></tr>
<tr><td>7</td></tr>
<tr><td>8</td><td colspan="8" rowspan="2">USER NAME</td><td rowspan="2">406</td></tr>
<tr><td>9</td></tr>
<tr><td>10</td><td colspan="8" rowspan="2">PASSWORD</td><td rowspan="2">407</td></tr>
<tr><td>11</td></tr>
</table>

| BYTE \ BIT | 7 | 6 | 5 | 4 | 3 | 2 | 1 | 0 |
|---|---|---|---|---|---|---|---|---|
| 0 | OPERATION CODE INDICATING START OF JOB WITH AUTHENTICATION TOKEN (= 0x0303) | | | | | | | |
| 1 | | | | | | | | |
| 2 | BLOCK NUMBER | | | | | | | |
| 3 | | | | | | | | |
| 4 | PARAMETER LENGTH | | | | | | | |
| 5 | | | | | | | | |
| 6 | FLAG AREA | | | | | | | |
| 7 | | | | | | | | |
| 8 | AUTHENTICATION TOKEN | | | | | | | |
| 9 | | | | | | | | |
| 10 | | | | | | | | |
| 11 | | | | | | | | |

408

PRINTING APPARATUS, PRINTING SYSTEM, AND CONTROL METHOD OF PRINTING APPARATUS TO DETERMINE WHETHER TO PERMIT OR RESTRICT PRINT JOBS

BACKGROUND OF THE INVENTION

Field of the Invention

The present invention relates to a printing apparatus which processes a print job transmitted from a host computer.

Description of the Related Art

Reduction of total cost of ownership (TCO) of a printing system, which includes not only initial installation costs of a printing apparatus and a system but also costs of consumables such as printing sheets and coloring agents like toners, has recently drawn a lot of attention from viewpoints of cost reduction in the office and preservation of the global environment.

A conventional issue in such a printing system is that any person who can access a network can perform printing using a printing apparatus installed in the office. No one is restricted to printing and no trace is left, so that users often have no scruples about printing more than necessary which leads to an increase in costs in the office.

As a solution for such a conventional issue, a printing system has been discussed which has a print restriction function of restricting output per user.

Japanese Patent Application Laid-Open No. 2009-199253 discusses a printing system which obtains printing function restriction information regarding a user who performs printing from a printing apparatus every time a host computer executes printing and restricts the printing function by referring to the restriction information.

Japanese Patent Application Laid-Open No. 2011-198166 discusses an image processing apparatus which receives authentication information and job setting information for user authentication which are transmitted from a host computer, performs authentication according to the authentication information, and accordingly enables execution of a job in a range of the job setting information.

As discussed in Japanese Patent Applications Laid-Open No. 2009-199253 and No. 2011-198166, there are various methods for user authentication and for obtaining print restriction information in print jobs.

SUMMARY OF THE INVENTION

The present invention is directed to the provision of a mechanism which contributes to reduction of TCO and improves user convenience and expandability of a printing system by applying an optimum restriction to a job without changing settings and configurations of a printing apparatus according to a job form in an environment including a plurality of job forms in which user authentication methods and print restriction information obtaining methods are different.

According to an aspect of the present invention, a system including a first computer, a second computer, and a printing apparatus includes a storage unit included in the printing apparatus and configured to store print restriction information defining a setting content to permit or restrict printing for each user, an obtainment unit included in the first computer and configured to obtain, from the printing apparatus, the print restriction information corresponding to a user of the first computer, a first transmission unit included in the first computer and configured to transmit, to a reception unit included in the printing apparatus, a first print job including the print restriction information obtained by the obtainment unit and a first print setting, a second transmission unit included in the second computer and configured to transmit, to the reception unit included in the printing apparatus, a second print job including identification information of a user of the second computer and a second print setting, and a control unit included in the printing apparatus and configured to determine whether to permit or restrict the first print job based on the first print setting and the print restriction information included in the first print job, and determine whether to permit or restrict the second print job based on the second print setting and print restriction information specified from the storage unit by using the user identification information included in the second print job.

Accordingly, the present invention can contribute to reduction of TCO and improve user convenience and expandability of a printing system by applying an optimum restriction to a job without changing settings and configurations of a printing apparatus according to a job form in an environment including a plurality of job forms.

Further features of the present invention will become apparent from the following description of exemplary embodiments with reference to the attached drawings.

BRIEF DESCRIPTION OF THE DRAWINGS

FIGS. 3A and 3B are examples of a user information database and a role information database.

FIG. 6 illustrates a configuration of a job packet included in a print job including restriction information.

FIG. 8 is an example of a format of restriction information included in a print job.

FIG. 10 illustrates a configuration of a job packet included in a print job including user authentication information.

FIG. 18 illustrates a configuration of a job packet included in a print job including an authentication token.

DESCRIPTION OF THE EMBODIMENTS

Various exemplary embodiments, features, and aspects of the invention will be described in detail below with reference to the drawings.

Figure 1:
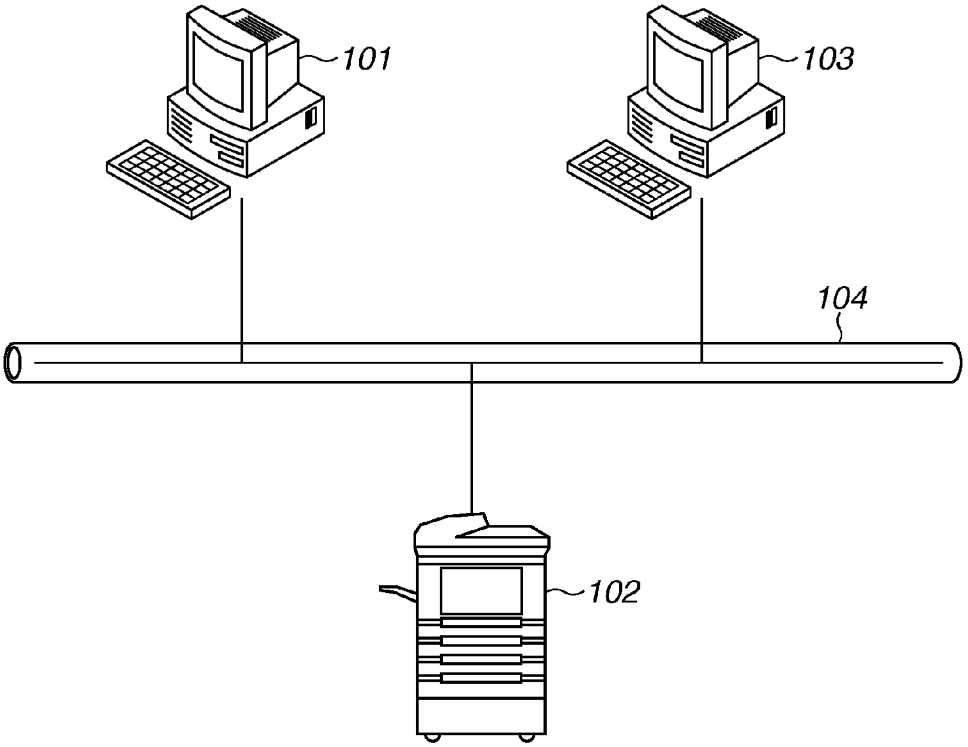
FIG. 1 is a general arrangement diagram of a printing system according to an exemplary embodiment of the present invention.

FIG. 1 illustrates a general arrangement of an example of a printing system according to a first exemplary embodiment.

As illustrated in FIG. 1, the printing system according to the present exemplary embodiment includes host computers 101 and 103, a printing apparatus 102, a network 104, and the like.

The host computers 101 and 103 are information processing apparatuses which generate image data by being used by a user and transmit a print job based on the image data to cause the printing apparatus 102 to perform printing. The printing apparatus 102 receives a print job from the host computers 101 and 103 via the network 104 and performs printing on a sheet medium using a known technique, such as electrophotography and an ink-jet printing technique. The printing apparatus 102 according to the present exemplary embodiment is an image forming apparatus, such as a multifunction peripheral (MFP). The host computers 101 and 103 and the printing apparatus 102 are connected to each other by the network 104 using a known technique, such as Ethernet (registered trademark).

The printing system according to the present exemplary embodiment has a print restriction function.

The printing apparatus 102 stores authentication information and role information (authority information) of a user therein and performs the user authentication when being instructed by the host computers 101 and 103 or receiving a print job.

Figure 2:
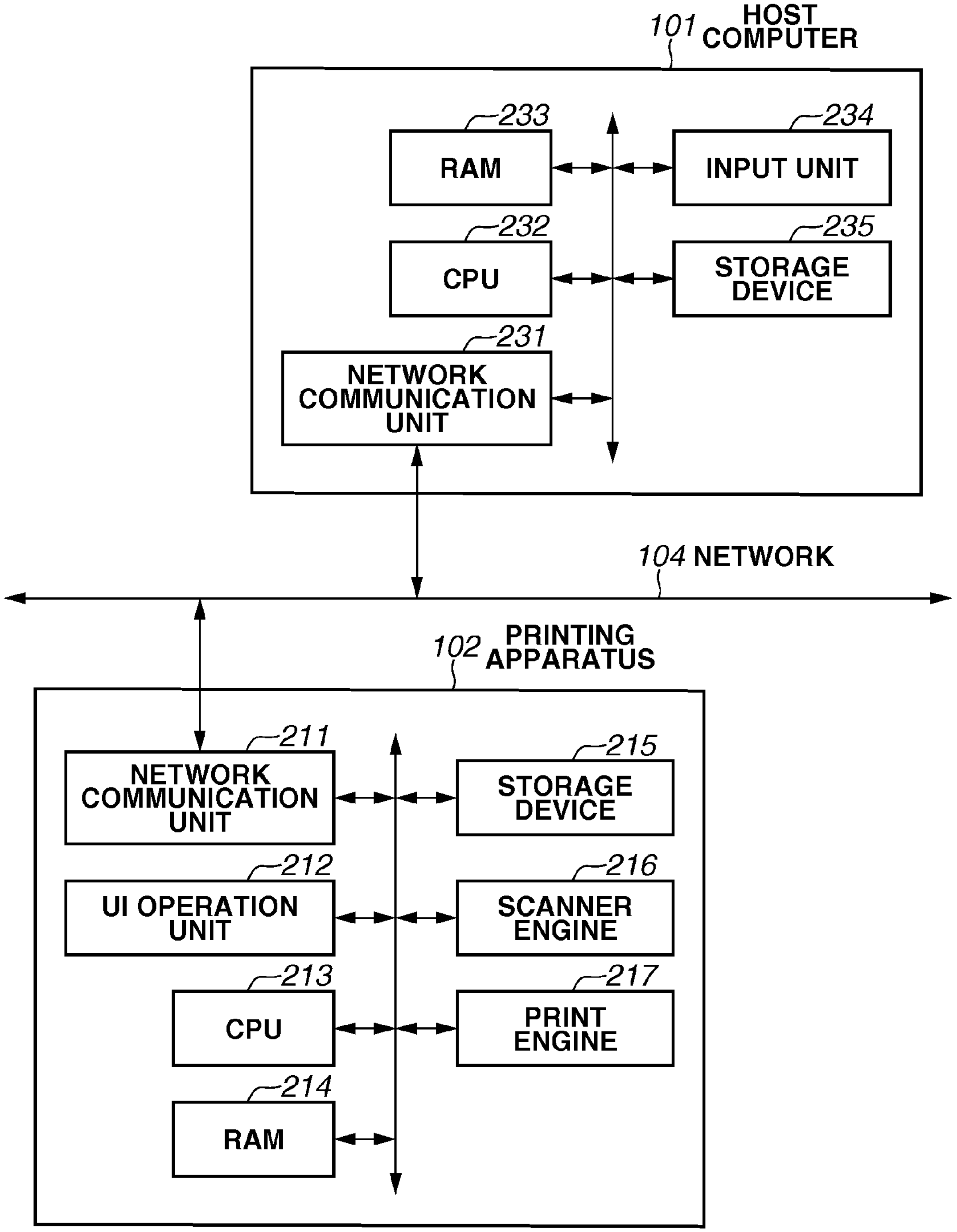
FIG. 2 is a hardware block diagram of devices included in the printing system according to the present exemplary embodiment.

FIG. 2 is a block diagram illustrating a schematic hardware configuration of devices included in the printing system according to the present exemplary embodiment.

First, the printing apparatus 102 is described.

In the printing apparatus 102, a network communication unit 211 performs communication with an external device (for example, the host computer 101) via the network 104. A user interface (UI) operation unit 212 receives a setting with respect to the printing apparatus 102, displays a status of the printing apparatus 102, and allows a user to operate the printing apparatus 102.

A central processing unit (CPU) 213 reads and executes a program stored in a storage device 215 to execute image processing and various types of control. A read-only memory (RAM) 214 temporarily stores information pieces, such as a program code executed by the CPU 213 and image data. The storage device 215 stores a program code, image data, below-described user information, and the like.

A print engine 217 prints image data on a sheet medium using the known technique, such as electrophotography and the ink-jet printing technique. A scanner engine 216 optically reads an image printed on a sheet medium.

In the above-described configuration, the printing function of the printing apparatus 102 is realized as follows.

When the printing apparatus 102 receives data of a print job transmitted from an external device (for example, the host computer 101) via the network communication unit 211, the CPU 213 converts the received data to image data according to the program code stored in the RAM 214. The converted image data is once stored in the storage device 215, subjected to necessary processing, and output by the print engine 217. The printing apparatus 102 also has a user authentication function. When the function of the printing apparatus 102 is provided for a user via the UI operation unit 212, first, the UI operation unit 212 requests a user to input a user name and a password, and the printing apparatus 102 determines whether the user is permitted to use the printing apparatus.

Next, the host computer 101 is described.

The host computer 103 includes a hardware configuration similar to that of the host computer 101.

A network communication unit 231 performs communication with an external device via the network 104. A CPU 232 reads and executes a program stored in a storage device 235 and the like to execute a various types of control. A RAM 233 temporarily stores information, such as a program code executed by the CPU 232. The storage device 235 stores a program code and data.

An input unit 234 receives a user input to the host computer 101. The input unit 234 functions as an operation unit and a display unit. The host computer 101 is provided with a printer driver corresponding to the printing apparatus 102 so as to generate a print job transmitted to the printing apparatus 102. The printer driver is installed in the storage device 235 and executed by the CPU 232.

FIGS. 3A and 3B are examples of outlines of a user information database and a role information database of each user stored in the printing apparatus 102.

FIG. 3A is a user information database 300, and FIG. 3B is a role information database 310.

As shown in FIG. 3A, the user information database 300 stores a user name 301, a password 302, and a role 303 for an individual user. In the user name 301, a user name is stored as user identification information. In the password 302, a password is stored. In the role 303, role information is stored.

In the password 302, a password in a plain text before encryption is stored for convenience sake. In reality, a hash value of the password is stored to prevent a leak of the password for security reasons, and authentication is performed by comparing the stored hash value with a hash value of an input password, however, detail descriptions thereof are omitted. In addition, it is obvious that only a person who has an administrator authority can perform reading and writing on the user information database 300 for security reasons as well.

In the user information database 300, a row 304 indicates user information of a user whose user name is "User1". In the user information of the user, a character string "Akd5sj4f" is registered as a password. An "administrator role" is stored as a role. Similarly, user information pieces of "User2", "User3", and "User4" are respectively stored in a row 305, a row 306, and a row 307.

When receiving a user authentication request, the printing apparatus 102 checks input user name and password with a user name and a password registered with the user information database 300 to perform user authentication.

As shown in FIG. 3B, the role information database 310 stores role information. The role information includes a roll name 311, a printing function 312, a color 313, a one-sided 314, and an Nup 315.

The printing function 312 indicates whether use of the printing function is permitted. The color 313 indicates whether use of color printing is permitted (i.e., information indicating permission or prohibition of use of a color printing function). When the use of color printing is prohibited, only monochromatic printing can be used. The one-sided 314 indicates whether use of one-sided printing is permitted (i.e., information indicating permission or prohibition of use of a one-sided printing function). When the use of one-sided printing is prohibited, only double-sided printing can be used. The Nup 315 indicates that a page layout arranged on one side of a sheet is a 1-up or more or 2-up or more (i.e., information indicating that printing is forced to use a function of arranging images of a plurality of specified pages on one side of a sheet). "1-up or more" means that there is no specific restriction on a page layout, and "2-up or more" means that it is necessary to arrange two or more pages on one side to perform printing. In other words, the role information database 310 manages information pieces indicating permission or prohibition of use of predetermined printing functions for each role as printing function restriction. Four types of restriction information are described above, however, restriction regarding other attributes and restriction information of a function other than the printing function may also be managed.

In the role information database 310, a row 316 indicates an entry of a role of which role name is "Administrator role". In the "Administrator role" in the row 316, "permitted" is stored in the printing function, the color printing, and the one-sided printing, and "1-up or more" is stored in the Nup printing, so that all functions can be used without restriction. Information pieces of "Role1", "Role2", and "Role3" are respectively stored in a row 317, a row 318, and a row 319. The "Role3" in the row 319 includes "prohibited" in the printing function 312 and cannot use the printing function itself, so that values in the color 313, the one-sided 314, and the Nup 315 are indefiniteness "–".

The user information database 300 and the role information database 310 both are used to obtain restriction information of each user. For example, when restriction information of the "User2" is obtained, first, the "Role1" is obtained as the role 303 of the "User2" from the user information database 300. Further, information pieces of the "Role1", namely the printing function, the color printing, and the one-sided printing are "permitted" and Nup printing is set to "2-up or more" are obtained from the role information database 310. These information pieces are the restriction information of the "User2".

As described above, the print restriction information can be managed for each user based on the user information database 300 in FIG. 3A and the role information database 310 in FIG. 3B.

Next, a basic form of a print job in the printing system is described.

A print job includes one or more job packets which are standardized for facilitating recognition of a start and an end of the print job and setting of an attribute of the print job.

Figure 4:
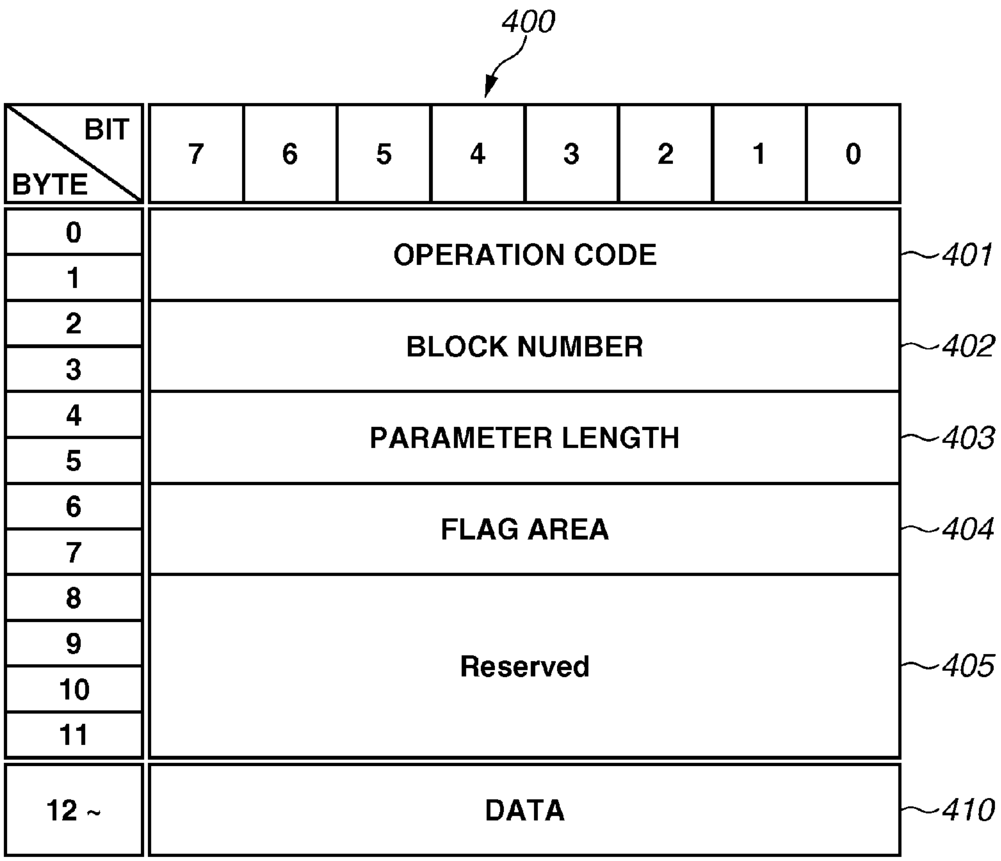
FIG. 4 illustrates a configuration of a job packet included in a print job.

FIG. 4 is an example of a configuration of a job packet included in a print job.

An ordinate and an abscissa of a job packet 400 in FIG. 4 respectively indicates bytes and bits of each byte.

An operation code 401 of zero and first bytes stores an identification (ID) of two byte long which indicates a function of the packet. A value of the ID to be stored in the operation code 401 can be as follows.

0x0201: a job start operation
0x0202: a job attribute setting operation
0x0204: a page description language (PDL) data operation
0x0205: a job end operation
0x0301: a restriction information operation
0x0302: operation for starting a job with authentication information A block number 402 of second and third bytes stores a block number which is used, when a transmission side transmitting a job packet 400 requests a response from a reception side, to clarify which response from the reception side corresponds to which response request from the transmission side.

For example, when the transmission side sequentially transmits three job packets having block numbers 1, 2, and 3, and an error packet having a block number 2 is returned, the transmission side can specify that an error occurs in the job packet transmitted in the second.

A parameter length 403 of fourth and fifth bytes is an area indicating a bite length of data 410 stored in twelfth and subsequent bytes and can store values from 0 to 64 kilobytes.

A flag area 404 of sixth and seventh bytes is an area storing various flags of the job packet 400. An error flag, a notification flag, a continuation flag, a response request flag, and other flags are stored, but detail descriptions thereof are omitted.

A reserved area 405 of eighth to eleventh bytes is used to transmit user information or the like, which is described below.

The data 410 of the twelfth and subsequent bytes stores data corresponding to the above-described operation code 401. When the operation code 401 is a job start operation or a job end operation, no data exists in the data 410. Whereas, when the operation code 401 is a job attribute setting operation, a job attribute ID and a job attribute value to be set are stored in the data 410. The job attribute ID is an identifier assigned to an attribute or an environment regarding the job, and the ID is preliminarily assigned.

Typical job attribute IDs are as follows.

0x0101: a job name
0x0103: a job owner name
0x016a: a job size
0x0174: a number of print pages
0x0201: double-sided printing
0x0202: color
0x0203: Nup In addition to the above, a job attribute, such as a number of copies and stapling, and ID corresponding to these attributes can be assigned according to functions of the printing apparatus 102.

Figure 5:
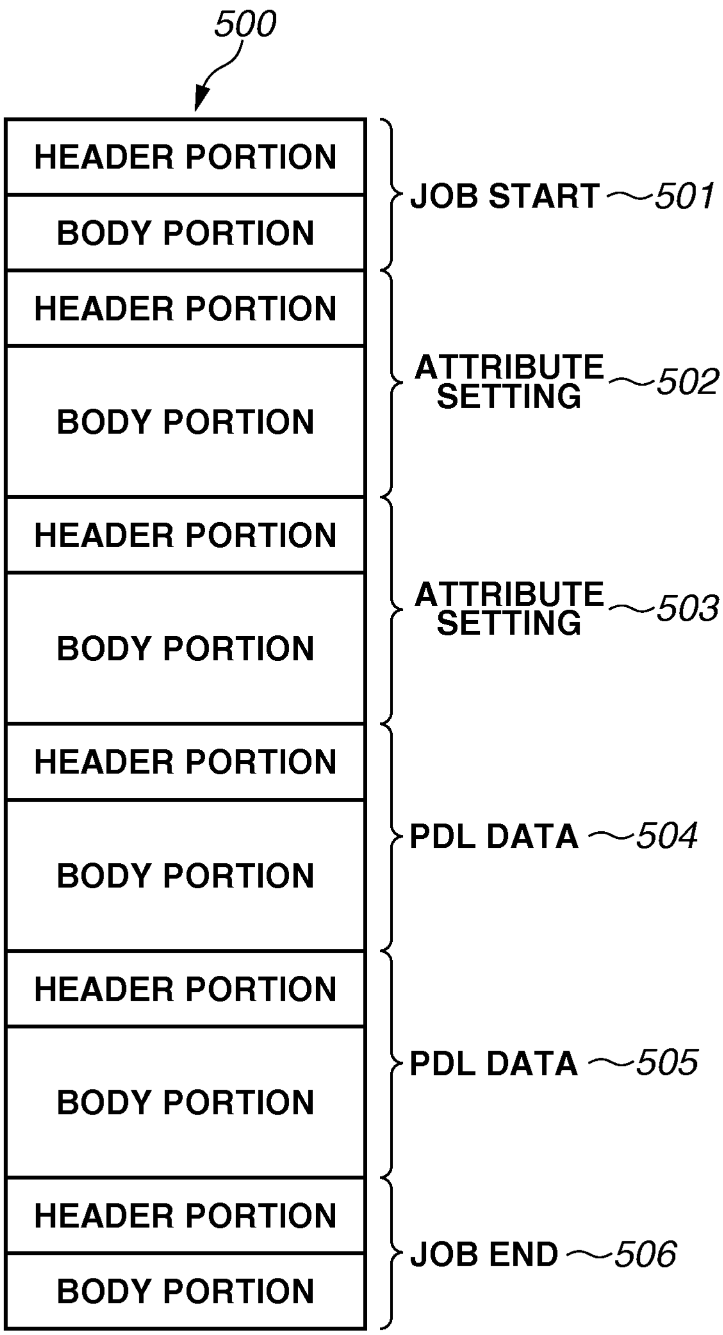
FIG. 5 illustrates a schematic configuration of a print job.

FIG. 5 is an example of a schematic configuration of a print job.

As illustrated in FIG. 5, a print job 500 includes a plurality of job packets, namely a job start 501, attribute settings 502 and 503, PDL data 504 and 505, and a job end 506. These job packets are transmitted from the host computer 101 to the printing apparatus 102 in order from a leading job packet to subsequent job packets. A job packet includes a header portion and a body portion. The header portion indicates a header area of the zero to eleventh bytes in FIG. 4, and a body portion indicates a data area of the twelfth and subsequent bytes.

The job start 501 is a job packet for declaring a start of a job. It can be determined from that "0x0201" indicating a job start operation is stored in the operation code 401 of the zero and first bytes.

The attribute settings 502 and 503 are job packets for setting attributes, such as a job name and an owner name of a print job and a print setting. It can be determined from that "0x0202" indicating a job attribute setting operation is stored in the operation code 401 of the zero and first bytes.

As illustrated in FIG. 5, when a plurality of attributes is set, job packets for setting a plurality of attributes may be added to the print job.

The PDL data pieces 504 and 505 are job packets for transmitting PDL data pieces. It can be determined from that "0x0204" indicating a PDL data operation is stored in the operation code 401 of the zero and first bytes. In a similar way, when a plurality of PDL data pieces is transmitted, job packets for a plurality of PDL data pieces may be added to the print job.

The job end 506 is a job packet for declaring an end of the job. It can be determined from that "0x0205" indicating a job end operation is stored in the operation code 401 of the zero and first bytes.

The basic form of a print job has been described above. Next, a print job form for the print restriction function according to the present exemplary embodiment is described.

There are two types of print job forms used for the print restriction function according to the present exemplary embodiment. A first print job form is the one in which restriction information is added to a print job. A second print job form is the one in which user authentication information is added to a print job. The printer drivers installed in the host computers 101 and 103 determine to use which form to issue a print job. According to the present exemplary embodiment, the host computer 101 issues a job in the first print job form, and the host computer 103 issues a job in the second print job form for descriptive purposes, however, the configuration of the present exemplary embodiment is not limited to this. Each form is described below.

First, a print job to which restriction information is added, namely a print job in the first print job form is described.

FIG. 6 is an example of a configuration of a job packet included in a print job to which the restriction information is added.

In a job packet 600 of the restriction information illustrated in FIG. 6, zero to eleventh bytes are a header portion, and twelfth and subsequent bytes are a body portion (a data area). An area 601 from the beginning to a NULL character 603 in the data area stores, for example, restriction information written in a format 801 described below in FIG. 8. An area 602 subsequent to the NULL character 603 in the data area stores information of a digital signature (128 bytes). A digital signature (an electronic signature) certifies that the restriction information 601 is issued by a qualified authentication apparatus (the printing apparatus 102 in FIG. 1), and the restriction information is not rewritten by a wrongful means in a midway (validity of the restriction information).

A digital signature generally uses, for example, Rivest-Shamir-Adleman (RSA) public key cryptosystem. Regarding a digital signature based on the public key cryptosystem, a digest is generated from a signature object (the restriction information 601 in this case) by a unidirectional function, the digest is encrypted using a secret key stored in an issuance source (the printing apparatus 102 in this case), and the digital signature is generated. The printing apparatus 102 performs verification on the received restriction information by the digital signature using a public key of the issuance source. Only the qualified authentication apparatus stores the secret key, and the signature verification using a proper public key is successful, a signature object can be proven as qualified.

Figure 7A:
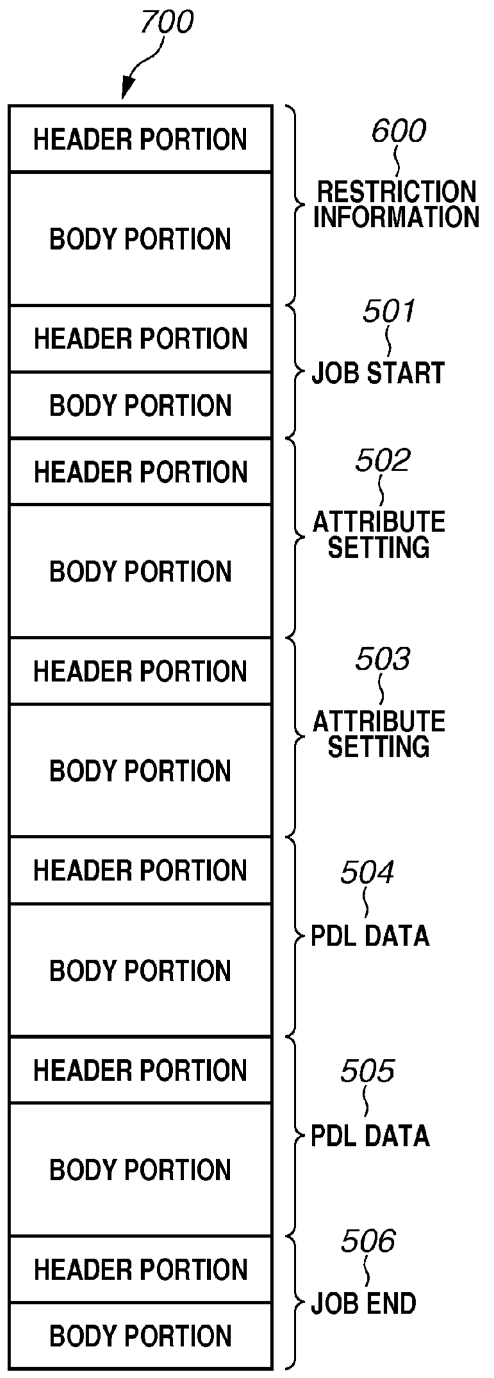
FIGS. 7A and 7B illustrate schematic configurations of a print job including restriction information and a print job including user authentication information.

FIG. 7A is an example of a schematic configuration of a print job to which the restriction information illustrated in FIG. 6 is added (the first print job form). The same reference numerals are attached to the same components in FIG. 5.

A print job 700 in FIG. 7A is different from the above-described print job 500 in FIG. 5 and includes the restriction information packet 600 in FIG. 6 at its head as a job packet indicating the restriction information. The restriction information packet 600 can be determined from that a code "0x0301" indicating a restriction information operation is stored in the operation code 401 of the zero and first bytes. A job packet in which a restriction information operation is specified stores the restriction information in the data area.

FIG. 8 is an example of a format of the restriction information 601 in FIG. 6.

In FIG. 8, the format 801 indicates that use of the printing function is permitted (PdlPrint is "Permit"), use of the color printing is permitted (ColorPrint is "Permit"), use of the one-sided printing is prohibited (Simplex is "Deny"), and the Nup printing is set to 2-up or more (Nup is 2) as the print restriction information of the print job 700 in FIG. 7A. In other words, the format 801 indicates the restriction information of the "Role2" in the row 318 in FIG. 3B.

Next, processing for generating and transmitting the print job 700 by the host computer 101 is described with reference to a flowchart in FIG. 9.

Figure 9:
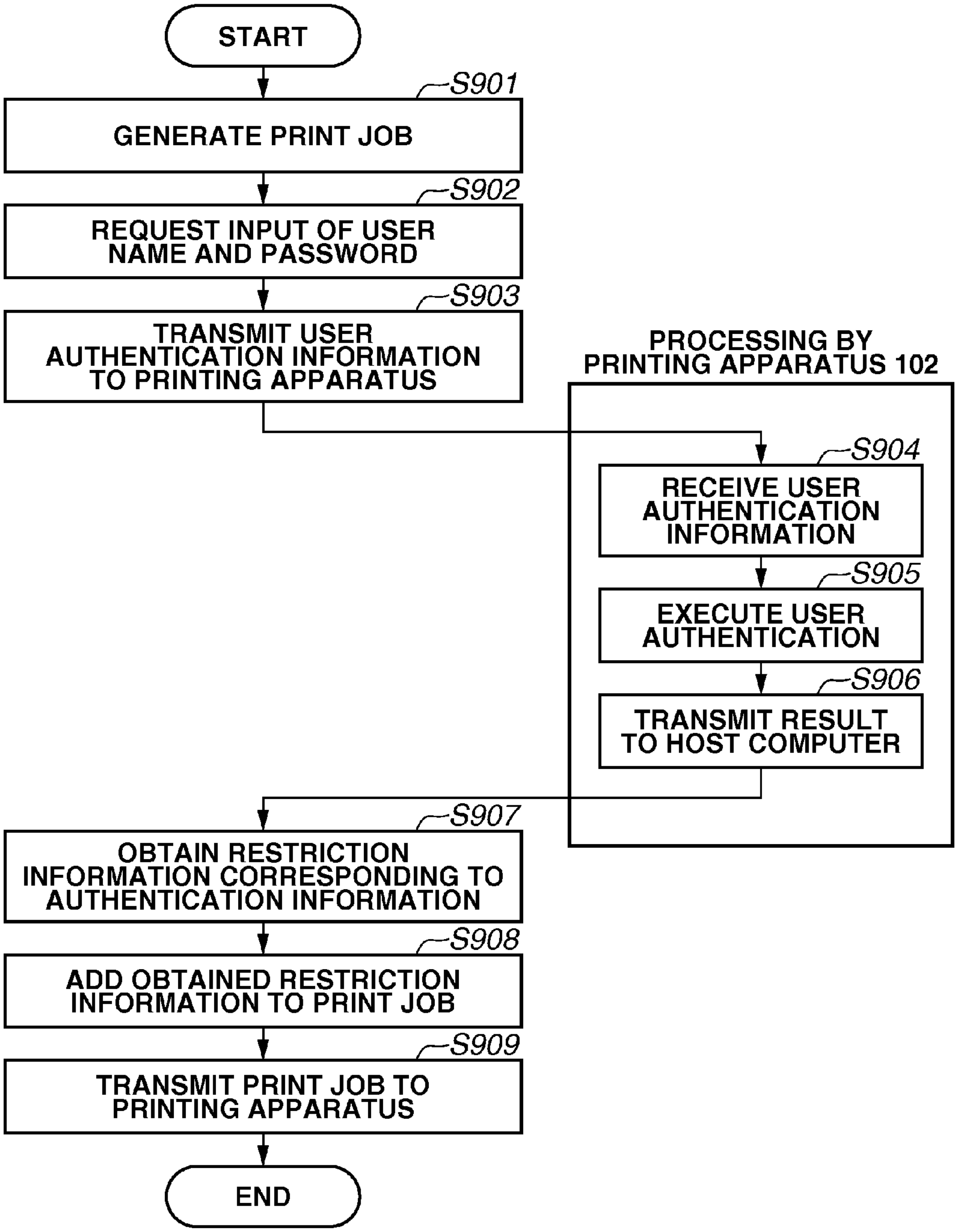
FIG. 9 is a flowchart illustrating generation processing of a print job including restriction information.

FIG. 9 is a flowchart illustrating generation processing of a print job including the restriction information in the first print job form. The processing of the host computer 101 in the present flowchart is executed by a function which is realized by the CPU 232 of the host computer 101 reading and executing a program (a printer driver corresponding to the first print job form or the like) stored in the storage device 235. The processing of the printing apparatus 102 in the present flowchart is executed by a function which is realized by the CPU 213 of the printing apparatus 102 reading and executing a program stored in the storage device 215.

In step S901, when a user generates a document file using a document file generation application software installed in the host computer 101 or the like and instructs printing, the CPU 232 of the host computer 101 generates a print job by the printer driver. The printer driver corresponds to the first print job form as described above.

Next, in step S902, the CPU 232 of the host computer 101 requests the user to input a user name and a password. When the user name and the password are input, the CPU 232 of the host computer 101 advances the processing to step S903.

In step S903, the CPU 232 of the host computer 101 transmits the input user authentication information (the user name and password) to the printing apparatus 102 and request it to perform user authentication. In this regard, the password is transmitted as a hash value of the password or an encrypted password to keep the password confidential, however details thereof are omitted since the technique is publicly known.

In step S904, when the CPU 213 of the printing apparatus 102 receives the user authentication information (the user name and password), in other words, an authentication request using the user authentication information, advances the processing to step S905.

In step S905, the CPU 213 of the printing apparatus 102 compares the received user authentication information (the user name and password) with a user name and a password stored in the user information database 300 to determine whether the user name and password match with the stored ones to perform the user authentication.

If it is determined that the received user authentication information matches with the stored user name and password, the CPU 213 of the printing apparatus 102 regards that the user authentication is successful and generates the restriction information 801 as shown in FIG. 8 from the information stored in the role information database 310 based on the role information 303 of the relevant user. In the restriction information, restrictions on the color, one-sided, and Nup printing and others are specified so as to restrict an output result of a print job with respect to the authenticated user as shown in FIG. 8.

When the user authentication is successful, in step S906, the CPU 213 of the printing apparatus 102 adds a digital signature generated from its own secret key to the generated restriction information and transmits (returns) the restriction information to which the digital signature added to the host computer 101 which is a transmission source of the user authentication information.

On the other hand, in step S905, if the CPU 213 of the printing apparatus 102 determines that the received user authentication information does not match with the user name and password stored in the user information database 300, in step S906, the CPU 213 of the printing apparatus 102 notifies the host computer 101 of a result as a failure of the user authentication. In this case, the CPU 232 of the host computer 101 receives the result as the failure of the user authentication from the printing apparatus 102, displays the failure of the user authentication on a display, and terminates the processing, which are not illustrated.

In step S907, the CPU 232 of the host computer 101 receives the restriction information transmitted from the printing apparatus 102 to which the digital signature is added and advances the processing to step S908.

In step S908, the CPU 232 of the host computer 101 adds the restriction information and the signature obtained in step S907 to the print job generated in step S901. More specifically, the CPU 232 of the host computer 101 stores the obtained restriction information and signature in the data areas 601 and 602 of the restriction information packet 600, generates a restriction information packet 600, and adds the restriction information packet 600 to the print job.

In step S909, the CPU 232 of the host computer 101 transmits the print job to which the restriction information is added in step S908 to the printing apparatus 102.

The printing apparatus 102 which receives the print job corresponding to the above-described first print job form determines whether attribute information of the print job generated by the printer driver matches with information described in the restriction information, which is described below. When the attribute information does not match with the information, the attribute information of the print job generated by the printer driver is overwritten by giving priority to the information described in the restriction information. Then, the printing apparatus 102 executes the print job to perform printing.

In step S902, the CPU 232 of the host computer 101 requests the user to input the user name and the password, however, the user name and the password may be registered in the printer driver of the host computer 101 in advance to save user's trouble to input the user name and the password in each printing. In addition, the user name and other information may be input using an integrated circuit (IC) card or the like. Further, the restriction information and the signature obtained in step S907 may be stored in the printer driver for a certain period of time, so that the restriction information and the signature need not to be obtained from the printing apparatus 102 in each printing.

As described above, according to the first print job form, restriction information is added to a print job, and thus restrictions can be imposed on an output result of the print job if the print job is issued based on any attribute information (print setting or the like). In addition, if a program for analyzing the restriction information is installed in the printer driver of the host computer 101, a print job including attribute information according to the restriction information can be generated by applying the restriction information when the printer driver generates a print job. Accordingly, a user can confirm the restriction information before printing and performs printing using optimum attribute information according to the restriction information. In addition, a screen for warning that attribute information set by a user exceeds print restrictions based on the restriction information may be displayed to warn the user that the printing is not performed as the attribute set by the user.

Next, a print job to which user authentication information is added, namely a print job in the second print job form is described.

FIG. 10 is an example of a configuration of a job packet included in a print job in the second print job form to which the user authentication information is added.

In a job packet 610 illustrated in FIG. 10, zero to eleventh bytes are a header portion, and twelfth and subsequent bytes are a body portion (a data area) similar to FIG. 4. However, the job packet 610 is a job start packet, and the body portion from the twelfth and subsequent bytes does not exist. Eighth and ninth bytes of the header portion are used as an area for storing a user name 406, and tenth and eleventh bytes are used as an area for storing a password 407.

The job packet 610 can be determined from that a code "0x0302" indicating an operation for starting a job with authentication information is stored in the operation code 401 of the zero and first bytes.

Figure 7B:
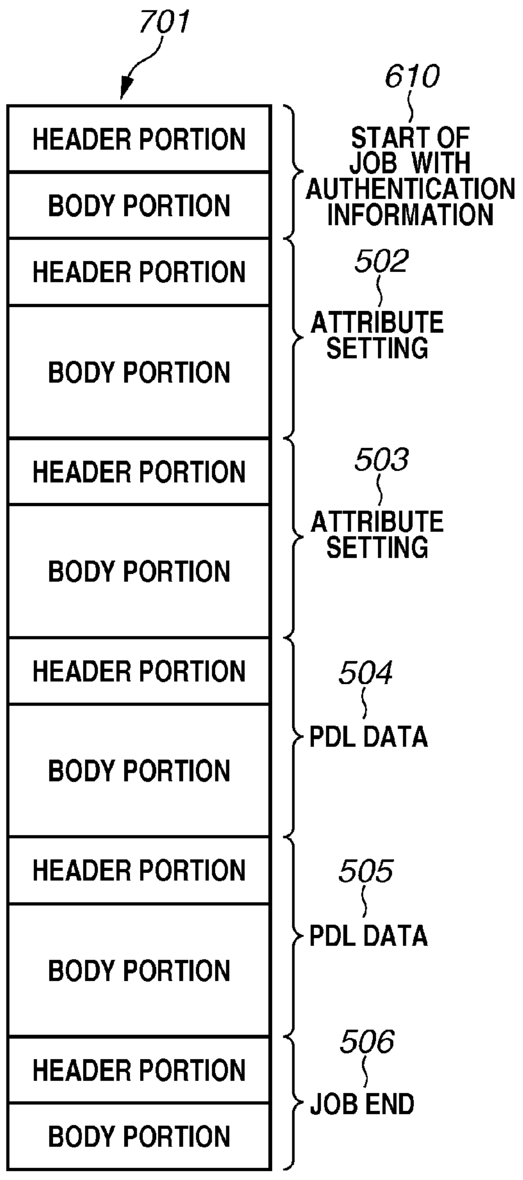

FIG. 7B is an example of a schematic configuration of a print job to which the user authentication information illustrated in FIG. 10 is added (the second print job form).

A print job 701 in FIG. 7B is obtained by replacing the job start packet 501 of the print job 500 in FIG. 5 with the packet 610 for starting a job with the authentication information in FIG. 10. As described above, the packet 610 for starting a job with the authentication information can be determined from that the operation code "0x0302" indicating a start of the job with the authentication information is stored in the operation code 401 of the zero and first bytes. A job packet in which an operation indicating a start of the job with the authentication information is specified stores the user name 406 in the eighth and ninth bytes and the password 407 in the tenth and eleventh bytes of the header portion Processing for generating and transmitting a print job in the second print job form by the host computer 103 is described with reference to a flowchart in FIG. 11.

Figure 11:
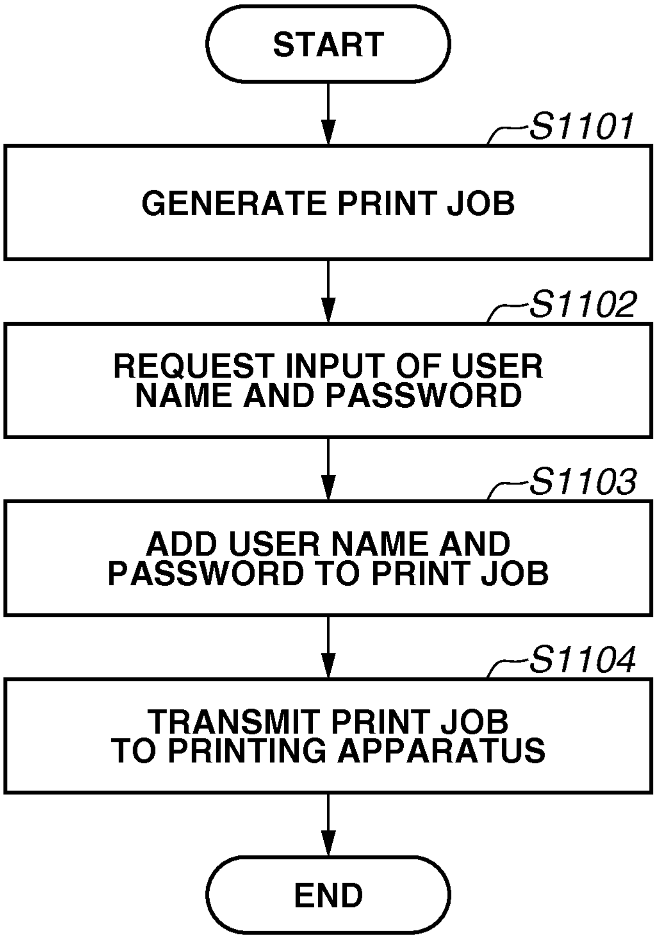
FIG. 11 is a flowchart illustrating generation processing of a print job including user authentication information.

FIG. 11 is a flowchart illustrating generation processing of a print job including user authentication information in the second print job form. The processing in the present flowchart is executed by a function which is realized by the CPU 232 of the host computer 103 reading and executing a program (a printer driver corresponding to the second print job form or the like) stored in the storage device 235.

First, in step S1101, as in the case of the first print job form in FIG. 9, when a user generates a document file using a document file generation application software installed in the host computer 103 or the like and instructs printing, the CPU 232 of the host computer 103 generates a print job by the printer driver. The printer driver corresponds to the second print job form as described above.

Next, in step S1102, the CPU 232 of the host computer 103 requests the user to input a user name and a password.

When the user name and the password are input, the CPU 232 of the host computer 103 advances the processing to step S1103.

In step S1103, the CPU 232 of the host computer 103 adds the input user authentication information (the user name and password) to the print job. More specifically, the CPU 232 of the host computer 103 stores the input user name and password in the user name 406 and the password 407 in FIG. 10, generates the packet 610 for starting a job with the authentication information, and adds the job packet 610 to the print job. In this regard, the password is added by generating a hash value of the password or an encrypted password to keep the password confidential, however details thereof are omitted.

Lastly, in step S1104, the CPU 232 of the host computer 103 transmits the print job to which the authentication information is added in step S1103 to the printing apparatus 102.

The printing apparatus 102 which receives the print job corresponding to the second print job form performs user authentication from the user name and the password added to the print job generated by the printer driver and obtains the restriction information with respect to the print job, which is described below. Then, the printing apparatus 102 determines whether the attribute information of the print job generated by the printer driver matches with information described in the obtained restriction information. When the attribute information does not match with the information, the attribute information of the print job generated by the printer driver is overwritten by giving priority to the information described in the restriction information. Then, the printing apparatus 102 executes the print job to perform printing.

As in the case of the first print job form, the user name and the password may be registered in the printer driver in advance to save user's trouble to input the user name and the password in each printing in step S1102.

As described above, according to the second print job form, the host computer 103 adds only a user name and a password to a print job, and thus a print job can be restricted on the printing apparatus 102 side. Accordingly, the host computer 103 and the printing apparatus 102 do not need to communicate with each other before transmitting a print job, and the processing can be simplified. According to the second print job form, restrictions can also be imposed on an output result of a print job if the print job is issued based on any attribute information (print setting or the like).

The above described first print job form and second print job form are used by selecting according to a usage environment of a user. In other words, a user can use the first print job form and the second print job form separately by installing a printer driver corresponding to either form in the host computer according to the usage environment. One type of a printer driver may correspond to the first print job form or the second print job form by settings.

Next, processing performed by the printing apparatus 102 when receiving a print job is described.

Figure 12:
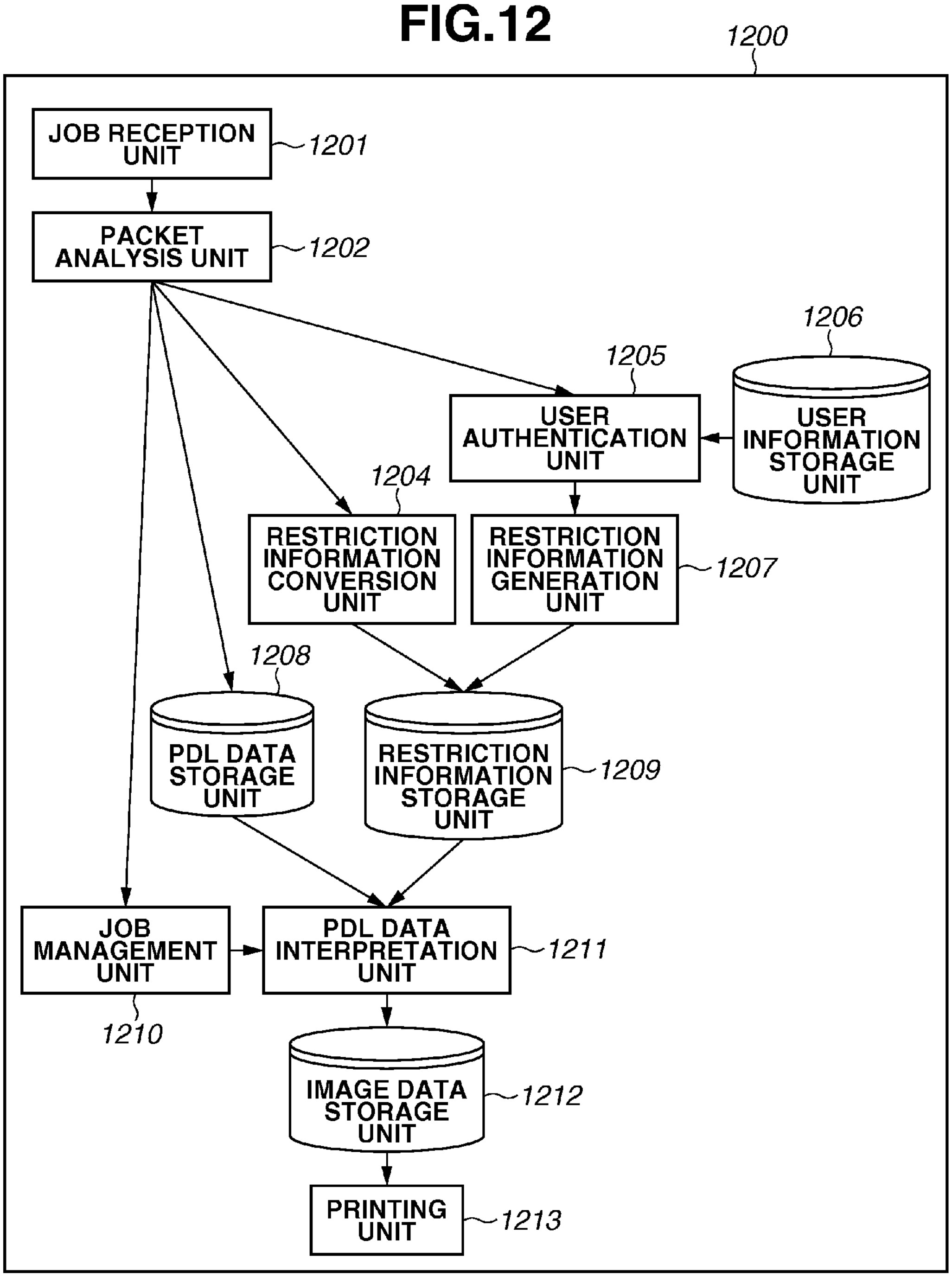
FIG. 12 is a software block diagram regarding print processing in the printing apparatus.

FIG. 12 is a block diagram illustrating a software configuration regarding print processing of the printing apparatus 102. A printing apparatus control program 1200 illustrated in FIG. 12 is a program for controlling the printing apparatus 102. Functions of the printing apparatus control program 1200 in FIG. 12 are realized by the CPU 213 reading a printing apparatus control program stored in the storage device 215 to the RAM 214 and executing it.

A job reception unit 1201 is connected to the network 104 and receives a print job using the network communication unit 211 from the host computer 101 or the host computer 103.

A packet analysis unit 1202 analyzes a print job received by the job reception unit 1201 by the packet based on the operation code 401.

If it is analyzed that the print job includes the restriction information, a restriction information conversion unit 1204 converts information described in the restriction information and stores the restriction information in a restriction information storage unit 1209.

If it is analyzed that the print job includes the authentication information (the user name and password), a user authentication unit 1205 compares the user name and the password included in the print job with information stored in a user information storage unit 1206 to perform the user authentication.

The user information storage unit 1206 includes the user information database 300 and the role information database 310 as illustrated in FIGS. 3A and 3B and functions as a management source which can manage the print restriction information for each user. The information of the user information storage unit 1206 is stored in the storage device 215 of the printing apparatus 102.

A restriction information generation unit 1207 obtains the role information regarding the user from the role information database 310 of the user information storage unit 1206 in response to a result of the user authentication by the user authentication unit 1205, generates the restriction information based on the role information, and stores the generated restriction information in the restriction information storage unit 1209. The restriction information storage unit 1209 stores the restriction information regarding the print job. Data in the restriction information storage unit 1209 is stored in the RAM 214 and may be stored in the storage device 215.

A PDL data storage unit 1208 temporarily stores PDL data included in the print job in the storage device 215.

A job management unit 1210 temporarily stores the attribute information of the print job, such as the number of copies and a monochromatic/color setting, in the storage device 215.

A PDL data interpretation unit 1211 obtains the PDL data from the PDL data storage unit 1208 and performs image forming processing thereon to generate image data according to the attribute information stored in the job management unit 1210 and the restriction information stored in the restriction information storage unit 1209.

An image data storage unit 1212 temporarily stores the image data generated by the PDL data interpretation unit 1211 in the storage device 215 until the printing is completed.

A printing unit 1213 prints the image data stored in the image data storage unit 1212 on a sheet medium or the like using the print engine 217.

Processing performed by the printing apparatus 102 when receiving a print job is described below with reference to flowcharts illustrated in FIGS. 13 to 15.

Figure 13:
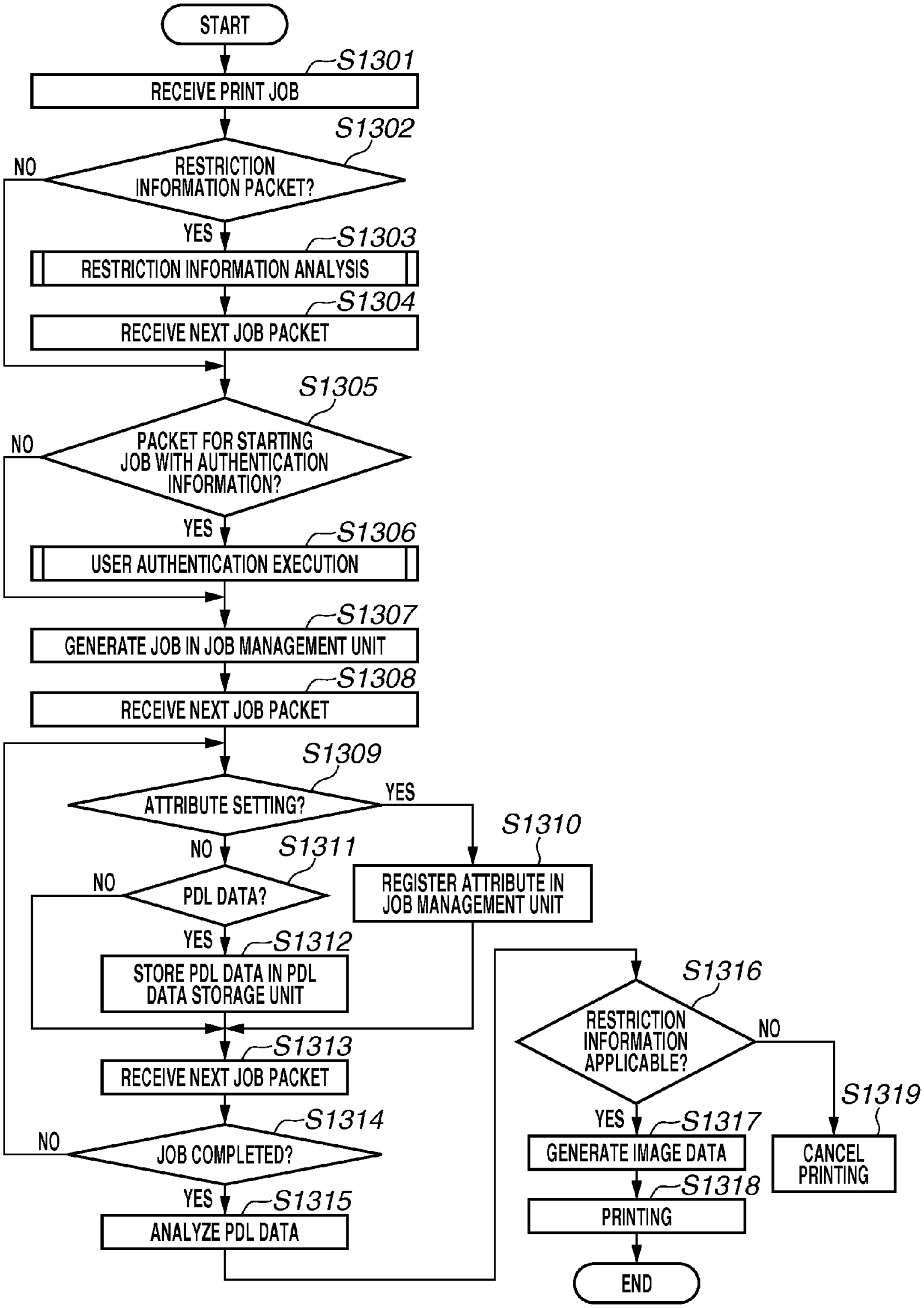
FIG. 13 is a flowchart illustrating print job reception processing in the printing apparatus.
Figure 14:
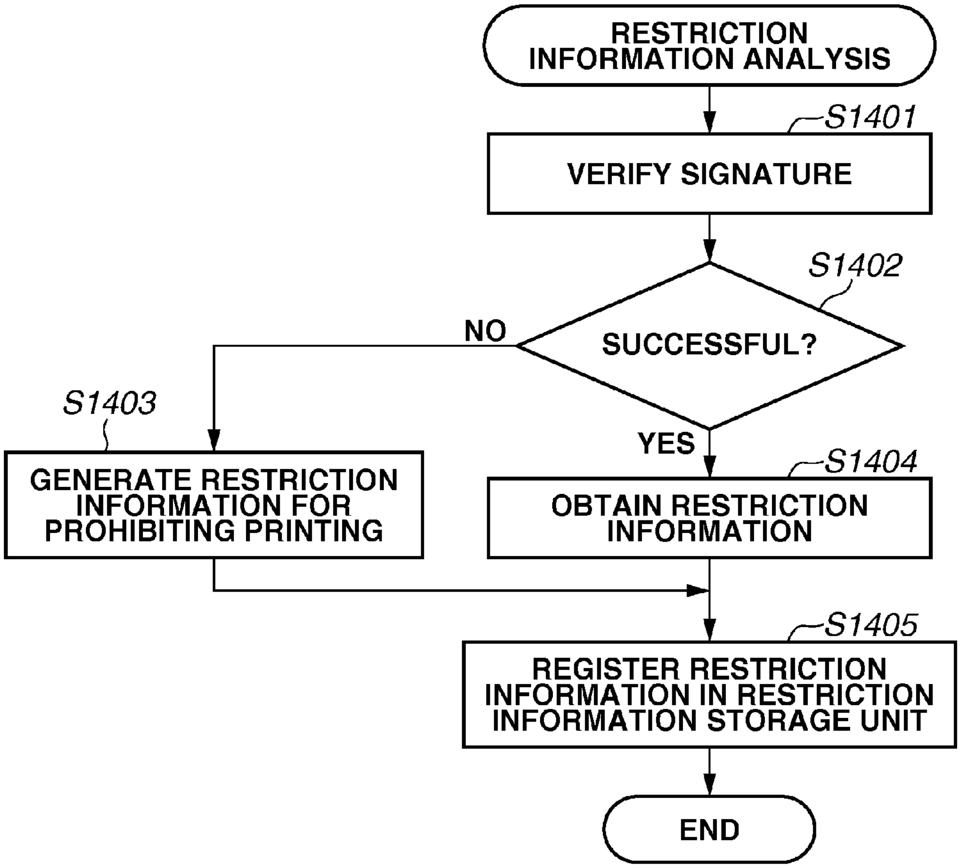
FIG. 14 is a flowchart illustrating restriction information analysis processing.
Figure 15:
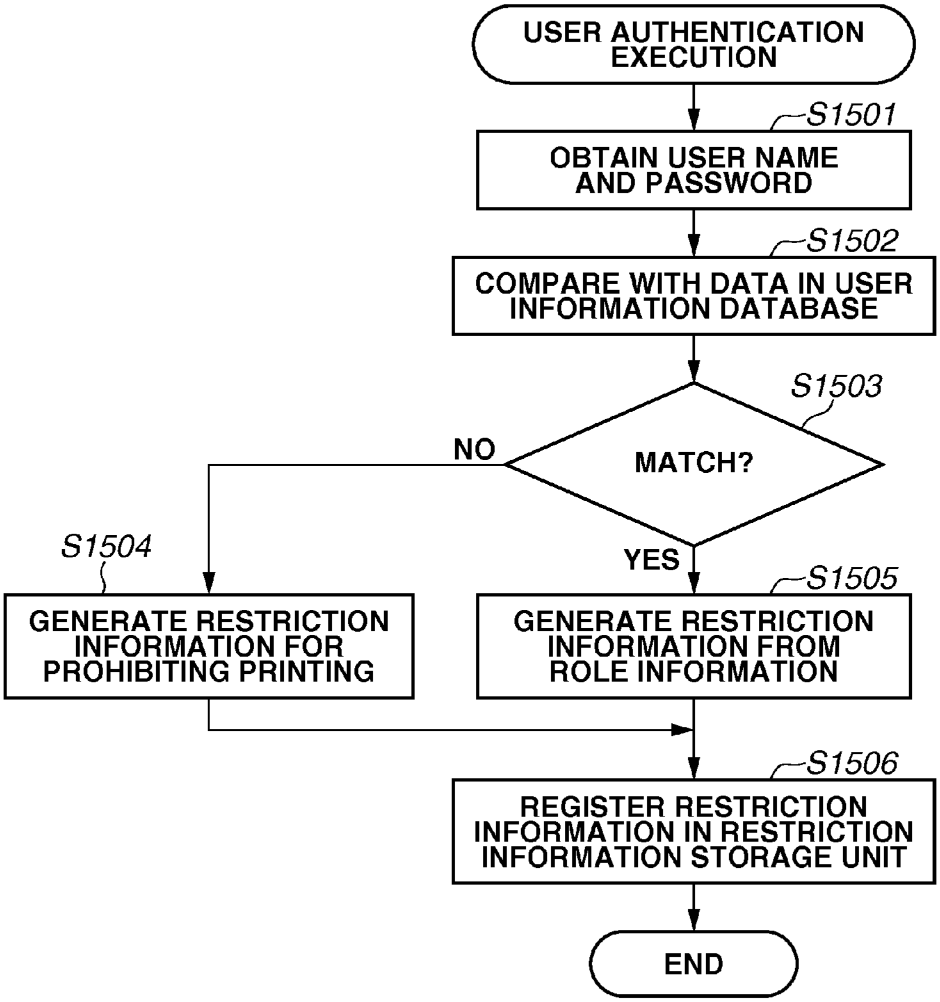
FIG. 15 is a flowchart illustrating user authentication processing according to a first exemplary embodiment.

FIGS. 13 to 15 are flowcharts illustrating print job reception processing by the printing apparatus according to the first exemplary embodiment. The processing in the flowcharts in FIGS. 13 to 15 are executed by the functions illustrated in FIG. 12 which are realized by the CPU 213 of the printing apparatus 102 reading and executing the printing apparatus control program 1200 and the like stored in the storage device 215.

First, in step S1301, when the job reception unit 1201 receives a print job by the network communication unit 211, the packet analysis unit 1202 executes the processing in step S1302.

In step S1302, the packet analysis unit 1202 obtains a job packet from the print job received in step S1301, further obtains a header portion of the job packet, and analyzes the operation code 401 of the header portion. The packet analysis unit 1202 determines whether the operation code 401 is a restriction information operation code "0x0301" indicating addition of the restriction information based on the analysis.

In step S1302, if the operation code of the header portion is determined as the restriction information operation code "0x0301" (YES in step S1302), the packet analysis unit 1202 transmits the job packet to the restriction information conversion unit 1204.

In step S1303, the restriction information conversion unit 1204 analyzes the job packet of the restriction information. The analysis of the restriction information packet by the restriction information conversion unit 1204 is described with reference to FIG. 14. FIG. 14 is a flowchart corresponding to the restriction information analysis processing by the restriction information conversion unit 1204 (in step S1303 in FIG. 13).

As illustrated in FIG. 14, first, in step S1401, the restriction information conversion unit 1204 verifies a digital signature 602 using the public key of the printing apparatus 102 and, in step S1402, determines whether the signature verification is successful.

If it is determined that the signature verification is successful (YES in step S1402), in step S1404, the restriction information conversion unit 1204 obtains the restriction information as described in, for example, the format 801 (FIG. 8) from the area 601 of the job packet and stores (registers) the obtained restriction information in the restriction information storage unit 1209. In this regard, in step S1405, the restriction information conversion unit 1204 converts the restriction information into a form used by the printing apparatus control program 1200 so as to restrict (degenerate) the attribute information of the print job later.

Whereas if it is determined that the signature verification failed (NO in step S1402), in step S1403, the restriction information conversion unit 1204 generates the restriction information for prohibiting printing and, in step S1405, stores (registers) the generated restriction information in the restriction information storage unit 1209.

When the processing in step S1405 is finished, the restriction information conversion unit 1204 completes the restriction information analysis processing in FIG. 14.

When the restriction information analysis processing in FIG. 14 by the restriction information conversion unit 1204 is completed, in step S1304 in FIG. 13, the packet analysis unit 1202 receives a next job packet and advances the processing to step S1305.

In step S1302, if it is determined that the operation code of the header portion is not the restriction information operation code "0x0301" (NO in step S1302), the packet analysis unit 1202 directly advances the processing to step S1305.

In step S1305, the packet analysis unit 1202 obtains the header portion of the job packet and analyzes the operation code 401 of the header portion. The job packet to be analyzed here is the job packet received in step S1304 in the case of YES in step S1302 and the job packet received in step S1301 in the case of NO in step S1302. In addition, the packet analysis unit 1202 determines whether the operation code 401 is "0x0302", namely an operation code for starting a job with authentication information indicating a start of the job with the authentication information based on the analysis.

In step S1305, if it is determined that the operation code of the header portion is the operation code for starting a job with authentication information "0x0302" (YES in step S1305), the packet analysis unit 1202 transmits the job packet to the user authentication unit 1205.

In step S1306, the user authentication unit 1205 executes the user authentication processing. The user authentication processing by the user authentication unit 1205 is described with reference to FIG. 15. FIG. 15 is a flowchart corresponding to the user authentication processing (in step S1306 in FIG. 13) by the user authentication unit 1205 according to the first exemplary embodiment.

As illustrated in FIG. 15, first, in step S1501, the user authentication unit 1205 obtains the user name 406 and the password 407 stored in the job packet.

Next, in step S1502, the user authentication unit 1205 compares the user name and the password obtained in step S1501 with the user name and the password stored in the user information database 300 of the user information storage unit 1206 to determine whether the obtained user name and password match with the stored ones and, in step S1503, determines a comparison result.

As a result of the comparison in step S1502, if it is determined that the obtained user name and password match with the stored ones (YES in step S1503), the user authentication unit 1205 determines that the user authentication is successful. If the user authentication is successful, in step S1505, the restriction information generation unit 1207 generates the restriction information based on the role information corresponding to the user which is stored in the role information database 310 of the user information storage unit 1206 and, in step S1506, stores (registers) the generated restriction information in the restriction information storage unit 1209.

Whereas, as a result of the comparison in step S1502, if it is determined that the obtained user name and password do match with the stored ones (NO in step S1503), the user authentication unit 1205 determines that the user authentication failed. If the user authentication failed, in step S1504, the restriction information generation unit 1207 generates the restriction information for prohibiting printing and, in step S1506, stores (registers) the generated restriction information in the restriction information storage unit 1209.

When the processing in step S1506 is finished, the restriction information conversion unit 1204 completes the user authentication processing in FIG. 15.

When the user authentication processing in FIG. 15 is completed, in step S1307 in FIG. 13, the job management unit 1210 secures an area for a print job and assigns a job identifier thereto as generation of a new print job.

Next, in step S1308, the packet analysis unit 1202 receives a next job packet and advances the processing to step S1309. Then, the processing from step S1309 to step S1314 is repeated until the packet analysis unit 1202 determines that an obtained job packet is a job end packet. The processing is described in detail below.

First, in step S1309, the packet analysis unit 1202 determines whether the operation code 401 is an attribute setting, in other words, the operation code 401 is a job attribute setting operation code "0x0202".

If the packet analysis unit 1202 determines that the operation code 401 is the job attribute setting operation code "0x0202" (YES in step S1309), in step S1310, the job management unit 1210 registers the attribute setting in an attribute area of the print job and advances the processing to step S1313.

Whereas if it is determined that the operation code 401 is not the job attribute setting operation code “0x0202” (NO in step S1309), the packet analysis unit 1202 advances the processing to step S1311.

In step S1311, the packet analysis unit 1202 determines whether the operation code is PDL data, namely a PDL data operation code “0x0204”.

If it is determined that the operation code is the PDL data operation code “0x0204” (YES in step S1311), in step S1312, the packet analysis unit 1202 stores the PDL data in the PDL data storage unit 1208 and advances the processing to step S1313.

Whereas if it is determined that the operation code is not the PDL data operation code “0x0204” (NO in step S1311), the packet analysis unit 1202 directly advances the processing to step S1313.

In step S1313, the packet analysis unit 1202 receives a next job packet and advances the processing to step S1314.

In step S1314, the packet analysis unit 1202 determines whether an operation code of the packet received in step S1313 is a job end, namely a job end operation code “0x0205”.

If it is determined that the operation code is not the job end operation code “0x0205” (NO in step S1314), the packet analysis unit 1202 returns the processing to step S1309.

Whereas if it is determined that the operation code is the job end operation code “0x0205” (YES in step S1314), the packet analysis unit 1202 advances the processing to step S1315.

If the received packet indicates a job end, in step S1315, the PDL data interpretation unit 1211 analyzes the PDL data based on the restriction information.

Next, in step S1316, the PDL data interpretation unit 1211 compares the attribute information of the job managed by the job management unit 1210 with the restriction information stored in the restriction information storage unit 1209 and determines whether the restriction information is applicable to the print job In the determination in step S1316, if printing complying with the restriction information can be performed by overwriting the attribute information of the print job with the restriction information, it is determined that the restriction information is applicable.

For example, in the case that one-sided printing is set in the attribute information of the print job, and double-sided printing is set in the restriction information, the PDL data interpretation unit 1211 determines that the restriction information is applicable and overwrites the attribute information of the print job with double-sided printing.

If printing complying with the restriction information cannot be performed even if the attribute information of the print job is overwritten with the restriction information (for example, when the restriction information is set to an inapplicable job attribute), the restriction information is determined as inapplicable.

When a job which does not include the restriction information or the user authentication information (such as a job 500 in FIG. 5) is received, the processing in step S1405 in FIG. 14 and in step S1506 in FIG. 15 are not performed, and thus the restriction information is not stored in the restriction information storage unit 1209. The PDL data interpretation unit 1211 also determines that the restriction information is not applicable when the restriction information is not stored in the restriction information storage unit 1209. In the processing, it is determined that use of the printing function is prohibited when the restriction information is not stored in the restriction information storage unit 1209. However, the printing apparatus 102 may include a setting for determining whether to permit or prohibit use of the printing function when the restriction information is not stored, and the PDL data interpretation unit 1211 may perform determination in step S1316 according to the setting.

In step S1316, if it is determined that the restriction information is not applicable to the print job (NO in step S1316), the PDL data interpretation unit 1211 notifies the job management unit 1210 of a fact that the restriction information is not applicable. In step S1319, when receiving the notification, the job management unit 1210 cancels the print job.

Whereas, in step S1316, if it is determined that the restriction information is applicable to the print job (YES in step S1316), the PDL data interpretation unit 1211 applies the restriction information to the print job by overwriting the attribute information of the print job so as to comply with the restriction information and advances the processing to step S1317.

In step S1317, the PDL data interpretation unit 1211 interprets the PDL data stored in the PDL data storage unit 1208 based on the attribute information of the print job to which the restriction information is applied and generates image data to be used in actual printing.

Lastly, in step S1318, the printing unit 1213 performs printing of the image data generated in step S1317 using the print engine 217.

As described above, according to the first exemplary embodiment, the printing apparatus 102 includes the following configurations. More specifically, when a print job including the restriction information or the user authentication information is received, the printing apparatus 102 stores the restriction information in the restriction information storage unit 1209 if the restriction information is included. Further, if the user authentication information is included, the printing apparatus 102 performs the user authentication and stores the restriction information obtained as a result of the user authentication in the restriction information storage unit 1209. Then, the printing apparatus 102 performs print restriction on the received job based on the restriction information stored in the restriction information storage unit 1209 when executing printing.

According to the above-described configuration, the first exemplary embodiment switches the restriction information to be obtained depending on which of the restriction information and the user authentication information is added to the received print job and stores the obtained restriction information in the restriction information storage unit 1209. Therefore, output of a print job can be restricted by the optimum restriction information for the job even in an environment in which a plurality of job forms exist which use different authentication methods and obtainment methods of the restriction information. Accordingly, the first exemplary embodiment can suppress unregulated print output by a user in any job form and contribute to reduction of TCO.

In addition, the restriction information storage unit 1209 of the printing apparatus 102 unitarily manages restriction information to a print job, and thus the first exemplary embodiment can maintain extensibility with respect to jobs of which authentication methods and forms of restriction information are different.

According to the above descriptions, the user authentication information is described using a user name and a password, however, the user authentication information is not limited to them, and other authentication information pieces may be used as long as the information can be used in the user authentication. For example, biometric authentication information can be used.

According to the above-described first exemplary embodiment, the processing of the printing apparatus 102 when receiving either the first print job form or the second print job form is described. According to a configuration of the printer driver installed in the host computer 101, a job in a form combining the first print job form and the second print job form can be further issued.

According to a second exemplary embodiment, the processing of the printing apparatus 102 when receiving a print job including both of the first print job form and the second print job form is described.

First, a schematic configuration of a print job according to the second exemplary embodiment is described with reference to FIG. 16.

Figure 16:
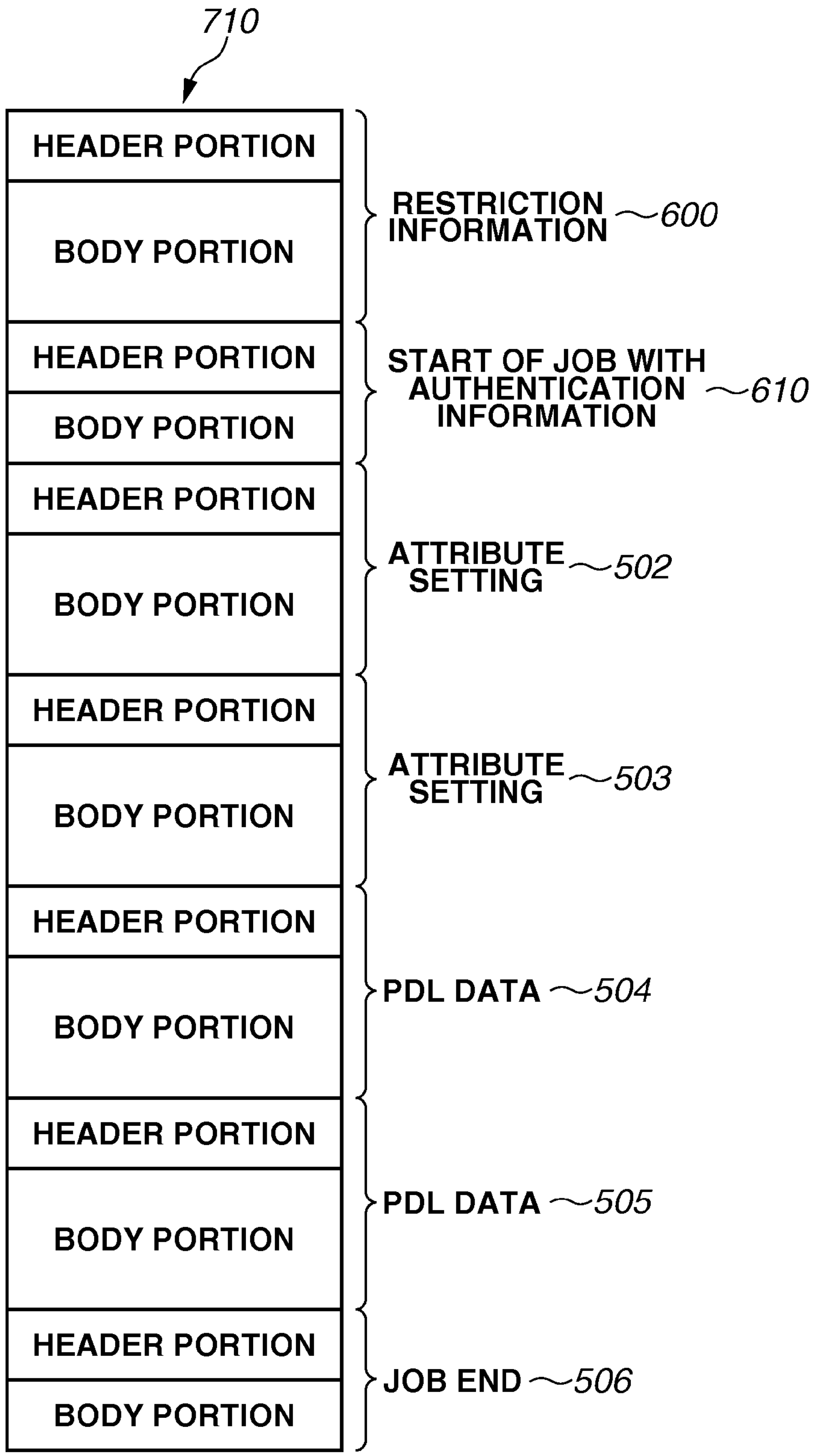
FIG. 16 is an example of a schematic configuration of a print job according to a second exemplary embodiment.

FIG. 16 is an example of the schematic configuration of a print job according to the second exemplary embodiment. The same reference numerals are attached to the same components in FIGS. 7A and 7B. A print job illustrated in FIG. 16 corresponds to a print job including both of the first print job form and the second print job form, in other words, a print job to which both of the restriction information and the user authentication information are added.

A print job 710 in FIG. 16 includes the restriction information packet 600 in FIG. 6 as a job packet indicating the restriction information at its head and the packet 610 for starting a job with the authentication information in FIG. 10 as a job start packet. According to a usage environment of a user, a configuration of a print job in FIG. 16 can be considered.

Next, the user authentication processing by the printing apparatus 102 when receiving a print job illustrated in FIG. 16 is described with reference to FIG. 17.

Figure 17:
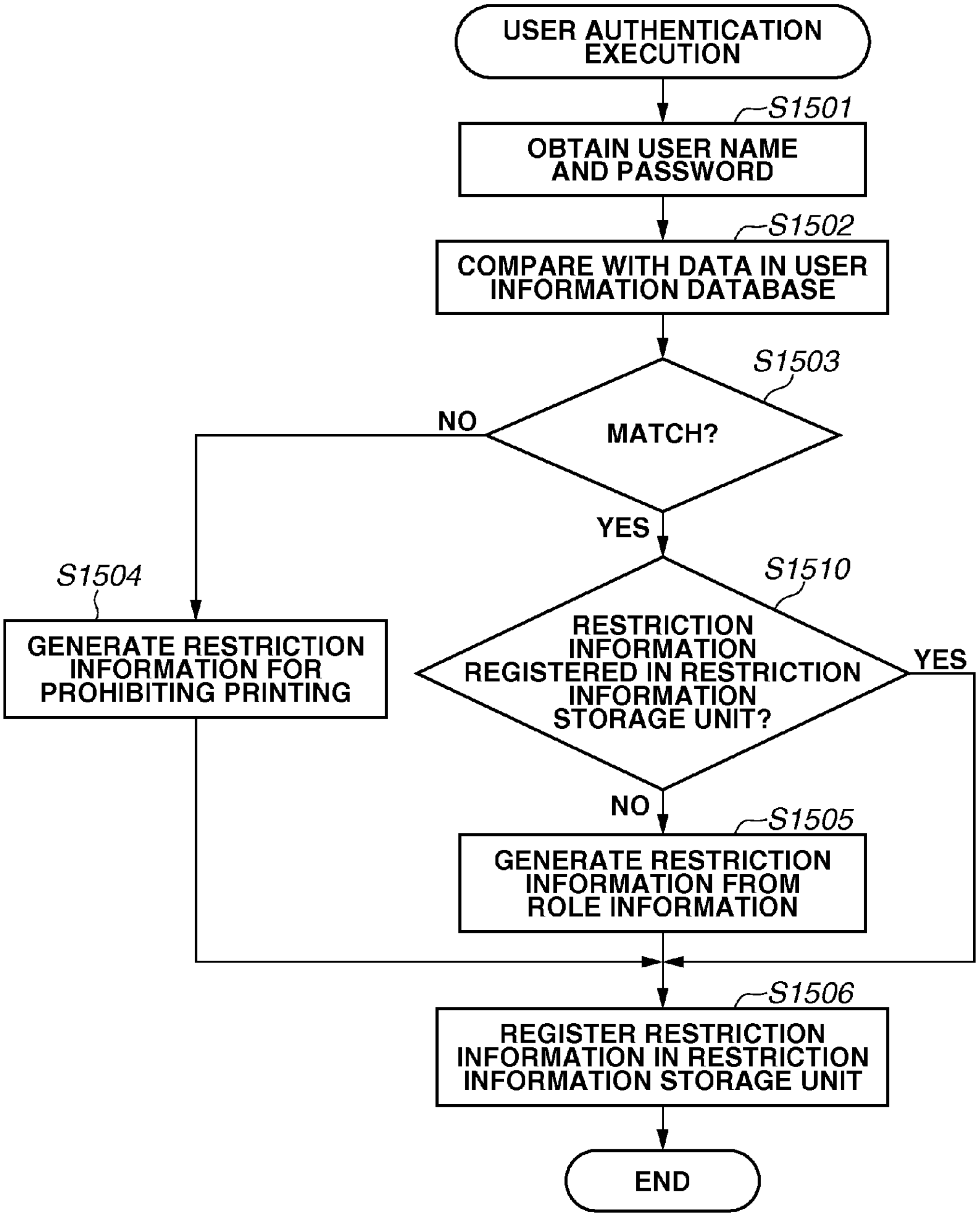
FIG. 17 is a flowchart illustrating user authentication processing according to the second exemplary embodiment.

FIG. 17 is a flowchart illustrating details of the user authentication processing (in step S1306 in FIG. 13) by the user authentication unit 1205 according to the second exemplary embodiment. The processing in the flowchart is executed by the functions illustrated in FIG. 12 which are realized by the CPU 213 of the printing apparatus 102 reading and executing the printing apparatus control program 1200 and the like stored in the storage device 215. The processing when a print job is received (FIG. 13) according to the second exemplary embodiment is similar to that of the first exemplary embodiment except for the processing in step S1306. The flowchart in FIG. 17 is obtained by adding the processing in step S1510 to the flowchart in FIG. 15, and the same step numbers are attached to the same steps in FIG. 15. The flowchart is described in detail below.

According to the second exemplary embodiment, when it is determined that the user name and the password obtained in step S1501 match with the user name and the password stored in the user information database 300 of the user information storage unit 1206 (YES in step S1503), the user authentication unit 1205 determines that the user authentication is successful and advances the processing to step S1510.

In step S1510, the user authentication unit 1205 determines whether the restriction information is stored in the restriction information storage unit 1209.

For example, when the print job 710 (a form combining the first print job form and the second print job form) in FIG. 16 is received, in step S1303 in FIG. 13, the restriction information 601 included in the restriction information packet 600 is stored in the restriction information storage unit 1209, so that the user authentication unit 1205 determines that the restriction information is already stored (YES in step S1510).

When the print job 700 (the second print job form) in FIG. 7A is received, the restriction information is not stored in the restriction information storage unit 1209, so that the user authentication unit 1205 determines that the restriction information is not stored (NO in step S1510). In other words, the restriction information included in the restriction information packet 600 is used.

In step S1510, if it is determined that the restriction information is stored in the restriction information storage unit 1209 (YES in step S1510), the restriction information generation unit 1207 does not generate restriction information from the role information and advances the processing to the S1506.

Whereas if it is determined that the restriction information is not stored in the restriction information storage unit 1209 (NO in step S1510), the restriction information generation unit 1207 performs the processing in steps S1505 and S1506. In other words, as described in the first exemplary embodiment, the restriction information generation unit 1207 generates the restriction information based on the role information in step S1505 and stores the generated restriction information in the restriction information storage unit 1209 in step S1506.

As described above, if the restriction information is already stored in the restriction information storage unit 1209, the restriction information is not newly generated from the role information, and thus the print processing can be simplified when a print job (a form combining the first print job form and the second print job form) as illustrated in FIG. 16 is received.

In consideration of a case when the restriction information 601 added to the print job is different from the restriction information stored in the role information database 310, the printing apparatus 102 may include a setting for determining whether to generate the restriction information based on the role information even if it is determined in step S1510 in FIG. 17 that the restriction information is stored. If the setting for generating the restriction information based on the role information is ON, the restriction information generation unit 1207 generates the restriction information based on the role information and overwrite the one in the restriction information storage unit 1209 with the generated restriction information. Whereas if the setting for generating the restriction information based on the role information is OFF, the restriction information generation unit 1207 directly terminates the user authentication processing without storing the restriction information in the restriction information storage unit 1209.

In other words, if a print job is in a form including the print restriction information and the user authentication information, the print restriction information is obtained from the print job, or the print restriction information of a user authenticated by the user authentication information included in the print job is obtained depending on the setting.

A case when the restriction information 601 added to the print job is different from the restriction information stored in the role information database 310 is, for example, a case when a user having an administrator authority of the printing apparatus 102 updates information in the user information database 300 or the role information database 310 after the host computer 101 obtains the restriction information from the printing apparatus 102 in step S907 in FIG. 9.

Further, when the user authentication is successful in the user authentication unit 1205, there may be a case that user attribute information (for example, group information of the user), which is not illustrated, is obtained from the user information storage unit 1206 in addition to the role information. In such a case, even if it is determined in step S1510 that the restriction information is stored, the user attribute information which is not included in the print job 710 may be obtained from the user information storage unit 1206.

The user authentication is performed in step S1306 in FIG. 13 as described above, and thus the user attribute information not included in the print job 710 can be obtained again from the user information storage unit 1206. Therefore, it is useful that the printer driver generates a print job including both of the first print job form and the second print job form.

According to the above-described first exemplary embodiment, a print job form including the restriction information and a print job form including the user authentication information are described, however, a print job form may include an authentication token as information regarding the user authentication.

According to a third exemplary embodiment, a print job to which an authentication token is added is described as a third print job form.

FIG. 18 is an example of a configuration of a job packet included in a print job in the third print job form to which an authentication token is added.

In a job packet 620 illustrated in FIG. 18, zero to eleventh bytes are a header portion, and twelfth and subsequent bytes are a body portion (a data area) similar to FIG. 4. However, the job packet 620 is a job start packet, and the body portion from the twelfth and subsequent bytes does not exist. The eighth to eleventh bytes of the header portion are used as an area for storing an authentication token 408.

The job packet 620 can be determined based on that a code "0x0303" indicating an operation for starting a job with authentication token is stored in the operation code 401 of the zero and first bytes. A schematic configuration of a print job is not illustrated, however, it is obtained by replacing the packet 610 for starting a job with the authentication information in FIG. 7B with the packet 620 for starting a job with authentication token in FIG. 18.

Next, processing for generating and transmitting a print job in the third print job form by the host computer 101 is described with reference to a flowchart in FIG. 19.

Figure 19:
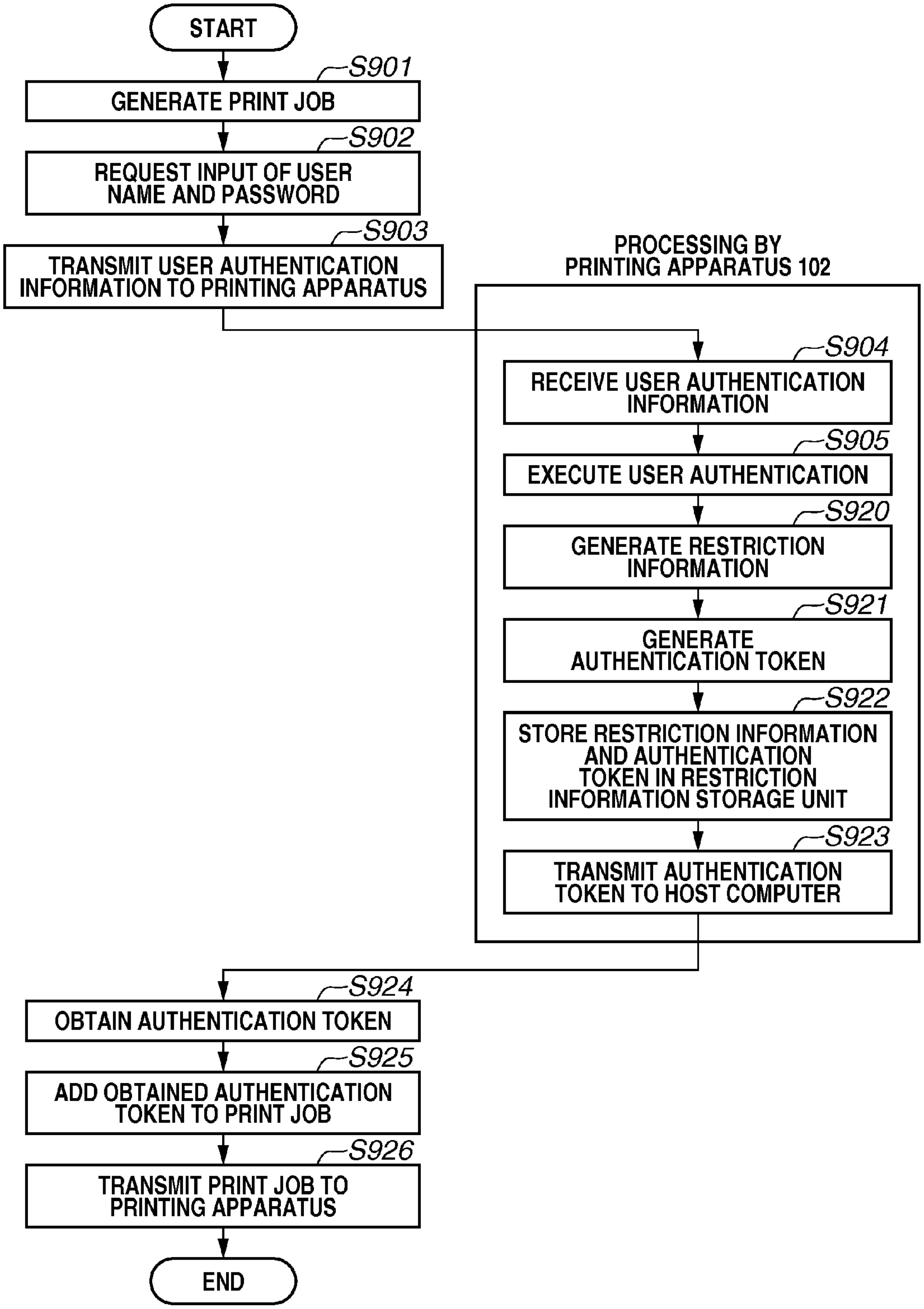
FIG. 19 is a flowchart illustrating generation processing of a print job including an authentication token.

FIG. 19 is a flowchart illustrating generation processing of a print job including an authentication token in the third print job form. The processing of the host computer 101 in the present flowchart is executed by a function which is realized by the CPU 232 of the host computer 101 reading and executing a program (a printer driver corresponding to the third print job form or the like) stored in the storage device 235. The processing of the printing apparatus 102 in the present flowchart is executed by a function which is realized by the CPU 213 of the printing apparatus 102 reading and executing a program stored in the storage device 215. The same step numbers are attached to the same steps in FIG. 9, and steps different from those in FIG. 9 are only described.

When it is determined that the user authentication information (the user name and password) received in step S904 matches with the user name and the password stored in the user information database 300, in step S920, the CPU 213 of the printing apparatus 102 regards that the user authentication is successful and generates the restriction information from the information stored in the role information database 310 based on the role information 303 of the user.

Next, in step S921, the CPU 213 of the printing apparatus 102 generates four bytes of data as an authentication token corresponding to the restriction information generated in step S920.

Next, in step S922, the CPU 213 of the printing apparatus 102 associates the authentication token generated in step S921 with the restriction information generated in step S920 and stores the authentication token in the restriction information storage unit 1209.

In step S923, the CPU 213 of the printing apparatus 102 transmits (returns) only the authentication token generated in step S921 to the host computer 101 which is a transmission source of the user authentication information.

In step S924, the CPU 232 of the host computer 101 obtains the authentication token transmitted from the printing apparatus 102 and advances the processing to step S925.

In step S925, the CPU 232 of the host computer 101 adds the authentication token obtained in step S924 to the print job generated in step S901. More specifically, the CPU 232 of the host computer 101 stores the obtained authentication token in the authentication token area 408 of the packet 620 for starting a job with authentication token to generate a packet for starting a job with authentication token and adds the obtained authentication token to the print job.

Then, in step S926, the CPU 232 of the host computer 101 transmits the print job to which the authentication token is added in step S925 to the printing apparatus 102.

As described above, when an authentication token is used as the third print job form, information about a user name and a password is not stored in a print job, so that a risk for leaking the information about the user name and the password from the print job can be eliminated, and the authentication can be performed in a secure way separately from the print processing. In addition, four bytes of an authentication token is only added to a print job, and thus a size of the print job can be smaller than by adding the restriction information, so that network traffic can be improved.

Next, the user authentication processing by the printing apparatus 102 when receiving a print job illustrated in FIG. 16 is described with reference to FIG. 20.

Figure 20:
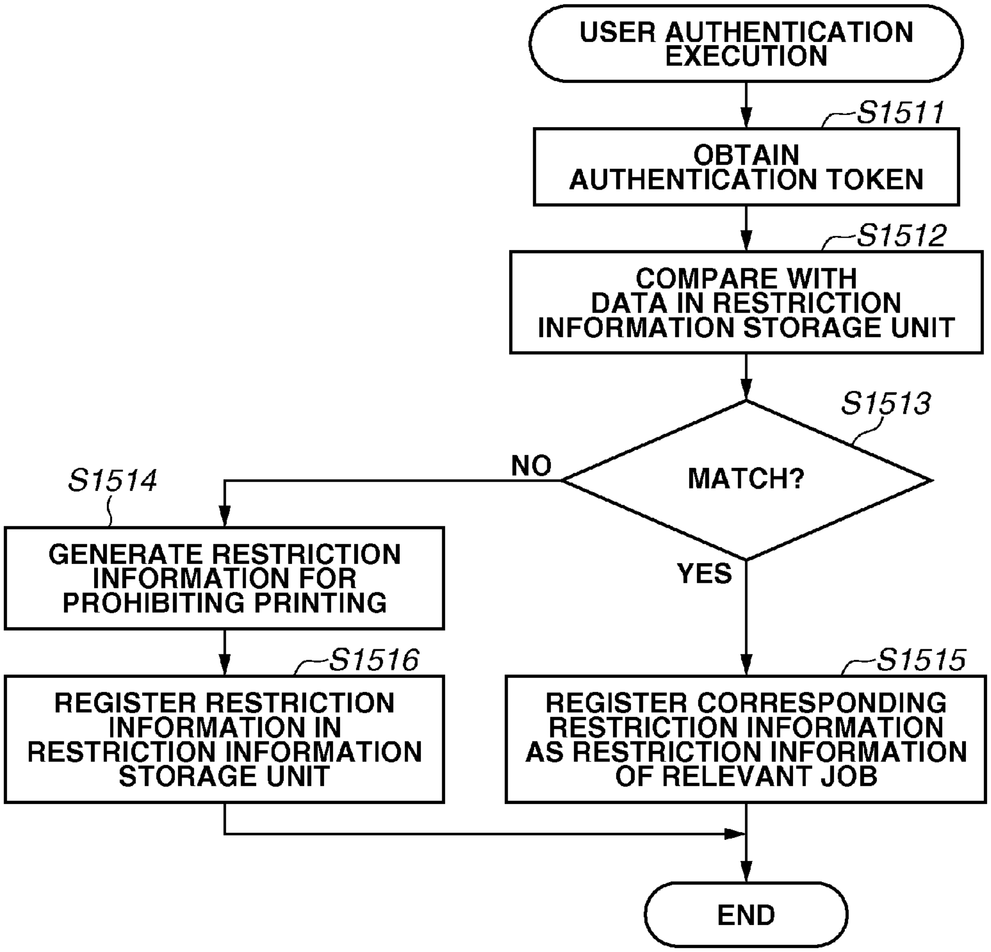
FIG. 20 is a flowchart illustrating user authentication processing according to a third exemplary embodiment.

FIG. 20 is a flowchart illustrating details of the user authentication processing (in step S1306 in FIG. 13) by the user authentication unit 1205 according to the third exemplary embodiment. More specifically, the user authentication processing in step S1306 in FIG. 13 is replaced with the processing in FIG. 20. The processing in the flowchart is executed by the functions illustrated in FIG. 12 which are realized by the CPU 213 of the printing apparatus 102 reading and executing the printing apparatus control program 1200 and the like stored in the storage device 215.

As illustrated in FIG. 20, first, in step S1511, the user authentication unit 1205 obtains the authentication token 408 stored in the job packet.

Next, in step S1512, the user authentication unit 1205 compares the authentication token obtained in step S1511 with the authentication token stored in the restriction information storage unit 1209 to determine whether the authentication tokens match with each other and, in step S1513, determines a comparison result.

As a result of the comparison in step S1512, if the user authentication unit 1205 determines that the authentication tokens match with each other (YES in step S1513), in step S1515, the restriction information generation unit 1207 stores (registers) the restriction information corresponding to the authentication token stored in the restriction information storage unit 1209 as the restriction information with respect to the print job in the restriction information storage unit 1209. At that time, the information which is stored in step S922 in FIG. 19 for associating the authentication token with the restriction information is deleted.

Whereas, as a result of the comparison in step S1512, if it is determined that the authentication tokens do not match with each other (NO in step S1513), the user authentication unit 1205 determines that the user authentication failed. If the user authentication failed, in step S1514, the restriction information generation unit 1207 generates the restriction information for prohibiting printing and, in step S1516, stores (registers) the generated restriction information in the restriction information storage unit 1209.

When the processing in step S1515 or in step S1516 is finished, the restriction information conversion unit 1204 completes the user authentication processing in FIG. 20.

The processing in the subsequent steps is similar to that in FIG. 13.

As described above, according to the third exemplary embodiment, the restriction information to be stored in the restriction information storage unit 1209 is not changed if the authentication token is added to the print job, so that the PDL data interpretation unit 1211 can restrict a print job without changing the processing. As described above, the restriction information storage unit 1209 unitarily manages restriction information to a print job, and thus the third exemplary embodiment can be easily extended to jobs of which authentication methods and forms of restriction information are different.

It is described in the above that the user authentication processing in step S1306 in FIG. 13 is replaced with the processing in FIG. 20. However, in step S1305 in FIG. 13, if the packet analysis unit 1202 determines that the operation code 401 is the operation code for starting a job with authentication information "0x0302", the user authentication processing in FIG. 15 or in FIG. 17 may be performed, and if the packet analysis unit 1202 determines that the operation code 401 is an operation code for starting a job with authentication token "0x0303", the user authentication processing in FIG. 20 may be performed.

The present invention includes a case when the printing apparatus 102 receives a print job including both of the third print job form and the first print job form. For example, when the user authentication is requested in step S903 in FIG. 9 or in FIG. 19, the printing apparatus 102 is configured to be able to specify whether to obtain the print restriction information or to obtain the authentication token. According to the specification, the printing apparatus 102 executes the processing from step S904 to step S906 in FIG. 9 or the processing from step S904 to step S923 in FIG. 19. In addition, the host computer 101 also executes the processing from step S907 to step S909 in FIG. 9 or the processing from step S924 to step S926 in FIG. 19 according to the specification. The above-described specification may be determined by the printer driver installed in the host computer 101.

According to each of the above-described exemplary embodiments, the printing apparatus 102 executes every user authentication, however, an authentication server, which is not illustrated, different from the printing apparatus 102 may execute the user authentication. In this case, the user information database 300 and the role information database 310 are managed by the authentication server.

When receiving a user authentication request, the CPU 213 of the printing apparatus 102 transmits received information about a user name and a password to the authentication server and obtains the restriction information from the authentication server as an authentication result. Accordingly, the CPU 213 of the printing apparatus 102 can impose restrictions on the printing function similar to the above-described exemplary embodiments.

The role information database 310 may be managed in the printing apparatus 102, and the authentication server may manage only the user information database 300. In this case, the CPU 213 of the printing apparatus 102 may obtain the role 303 of the authenticated user as a result of the authentication by the authentication server and generate the restriction information corresponding to the role from the role information database 310.

As described above, the present invention can restrict output of a print job by the optimum restriction information for the job even in an environment in which a plurality of authentication methods and obtainment methods of the restriction information exist and contribute to reduction of TCO by suppressing unregulated print output by a user. Further, the present invention can unitarily manage restriction information with respect to a print job and thus can maintain extensibility with respect to jobs of which authentication methods and forms of the restriction information are different.

Therefore, the present invention exerts effects of contributing to reduction of TCO and improving user convenience and expandability of a printing system by applying an optimum restriction to a job without changing settings and configurations of a printing apparatus according to a job form in an environment including a plurality of job forms.

The configuration and contents of above-described various data pieces are not limited to them and data may include various configurations and components according to applications and purposes.

While the present invention has been described with reference to exemplary embodiments, it is to be understood that the present invention can be realized by an embodiment as a system, an apparatus, a method, a program, a storage medium, and the like. Specifically, the present invention may be applied to a system configured from a plurality of devices or an apparatus configured from a single device.

In addition, combinations of the above-described exemplary embodiments are all included in the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-132331, filed Jun. 27, 2014, which is hereby incorporated by reference herein in its entirety.

What is claimed is:

1. A system including a first computer, a second computer, and a printing apparatus, the system comprising:

a storage device included in the printing apparatus and configured to store print restriction information defining a setting content to permit or restrict printing for each user;

an obtainment unit implemented by at least one processor in the first computer and configured to obtain the print restriction information in response to success of an authentication using user authentication information which is transmitted from the first computer;

a first transmission unit included in the first computer and configured to transmit, to the printing apparatus, a first print job including a first print setting and the print restriction information which has been obtained by the obtainment unit;

a second transmission unit included in the second computer and configured to transmit, to the printing apparatus, a second print job including a second print setting and user identification information of a user of the second computer, wherein the second print job does not include the print restriction information;

a determining unit implemented by at least one processor in the printing apparatus and configured to determine whether a print job transmitted to the printing apparatus is the first print job including the print restriction information or the second print job not including the print restriction information; and a control unit included in the printing apparatus and configured to determine whether to permit or restrict an execution of a print job, wherein, based on the determining unit determining that the first print job including the print restriction information is transmitted to the printing apparatus, the control unit determines whether to permit or restrict an execution of the first print job based on the first print setting and the print restriction information included in the first print job, and wherein, based on the determining unit determining that the second print job including the user identification information and not including the print restriction information is transmitted to the printing apparatus, the control unit uses the user identification information included in the second print job to obtain the print restriction information from the storage device and determines whether to permit or restrict an execution of the second print job based on the second print setting and the print restriction information obtained from the storage device.

2. The system according to claim 1, wherein the setting content defined in the print restriction information is a setting content regarding color printing or monochromatic printing.

3. The system according to claim 1, wherein the setting content defined in the print restriction information is a setting content regarding one-sided printing or double-sided printing.

4. The system according to claim 1, wherein the setting content defined in the print restriction information is a setting content regarding N-up.

5. The system according to claim 1, wherein the control unit specifies the print restriction information corresponding to the user of the first computer from the storage device in response to an obtainment request for the print restriction information transmitted from the first computer before transmission of the first print job and returns the specified print restriction information to the first computer.

6. The system according to claim 1, wherein the printing apparatus further comprises an image forming unit configured to form an image based on data that is included in the first print job and permitted to be printed by the control unit.

7. The system according to claim 1, wherein, based on the determining unit determining that the first print job includes the print restriction information, the control unit refrains from performing user authentication, and wherein, based on the determining unit determining that the second print job includes the user identification information, the control unit performs user authentication.

8. The system according to claim 1, wherein, in response to success of the authentication using the user authentication information which is transmitted from the first computer to the printing apparatus, the print restriction information is obtained from the printing apparatus.

9. A printing apparatus comprising:

at least one processor;

a storage device configured to store print restriction information defining a setting content to permit or restrict printing for each user;

a transmission unit configured to transmit, from the storage device to a first computer, the print restriction information in response to success of an authentication using user authentication information which is transmitted from the first computer to the printing apparatus;

a reception unit configured to receive, from the first computer, a first print job including a first print setting and the print restriction information which has been transmitted to the first computer from the printing apparatus and receive, from the second computer, a second print job including a second print setting and user identification information of a user of the second computer, wherein the second print job does not include the print restriction information;

a determining unit configured to determine whether a print job received by the reception unit is the first print job including the print restriction information or the second print job not including the print restriction information; and a control unit configured to determine whether to permit or restrict an execution of a print job, wherein, based on the determining unit determining that the received print job is the first print job including the print restriction information, the control unit determines whether to permit or restrict an execution of the first print job based on the first print setting and the print restriction information included in the first print job, wherein, based on the determining unit determining that the received print job is the second print job including the user identification information and not including the print restriction information, the control unit uses the user identification information included in the second print job to obtain the print restriction information from the storage device and determines whether to permit or restrict an execution of the second print job based on the second print setting and the print restriction information obtained from the storage device, and wherein at least one of the transmission unit, the reception unit, and the determining unit is implemented by the at least one processor.

10. The printing apparatus according to claim 9, wherein the first computer is a computer which transmits a print job including the print restriction information, and the second computer is a computer which does not transmit a print job including the print restriction information.

11. A method for controlling a system including a first computer, a second computer, and a printing apparatus, the method comprising:

storing, in a storage device included in the printing apparatus, print restriction information defining a setting content to permit or restrict printing for each user;

obtaining, via an obtainment unit implemented by at least one processor in the first computer, the print restriction information in response to success of an authentication using user authentication information which is transmitted from the first computer;

transmitting, to the printing apparatus from a first transmission unit included in the first computer, a first print job including a first print setting and the print restriction information which has been obtained by the obtainment unit;

transmitting, to the printing apparatus from a second transmission unit included in the second computer, a second print job including a second print setting and user identification information of a user of the second computer, wherein the second print job does not include the print restriction information;

determining, via a determining unit implemented by at least one processor in the printing apparatus, whether a print job transmitted to the printing apparatus is the first print job including the print restriction information or the second print job not including the print restriction information; and determining, via a control unit included in the printing apparatus, whether to permit or restrict an execution of a print job, wherein, based on the determining unit determining that the first print job including the print restriction information is transmitted to the printing apparatus, the control unit determines whether to permit or restrict an execution of the first print job based on the first print setting and the print restriction information included in the first print job, and wherein, based on the determining unit determining that the second print job including the user identification information and not including the print restriction information is transmitted to the printing apparatus, the control unit uses the user identification information included in the second print job to obtain the print restriction information from the storage device and determines whether to permit or restrict an execution of the second print job based on the second print setting and the print restriction information obtained from the storage device.

12. A non-transitory computer-readable storage medium storing a program to cause at least one processor of a printing apparatus, having a storage device which stores print restriction information defining a setting content to permit or restrict printing for each user, to perform a method, the method comprising:

transmitting, from the storage device to a first computer, the print restriction information in response to success of an authentication using user authentication information which is transmitted from the first computer to the printing apparatus;

receiving, from the first computer, a first print job including a first print setting and the print restriction information which has been transmitted to the first computer from the printing apparatus and receiving, from the second computer, a second print job including a second print setting and user identification information of a user of the second computer, wherein the second print job does not include the print restriction information;

determining whether a received print job is the first print job including the print restriction information or the second print job not including the print restriction information; and determining whether to permit or restrict an execution of a print job, wherein, based on a determination that the received print job is the first print job including the print restriction information, determining whether to permit or restrict an execution of a print job includes determining whether to permit or restrict an execution of the first print job based on the first print setting and the print restriction information included in the first print job, and wherein, based on a determination that the received print job is the second print job including the user identification information and not including the print restriction information, determining whether to permit or restrict an execution of a print job includes using the user identification information included in the second print job to obtain the print restriction information from the storage device and determining whether to permit or restrict an execution of the second print job based on the second print setting and the print restriction information obtained from the storage device.

* * * * *